United States Patent
Chen et al.

(10) Patent No.: US 10,050,880 B2
(45) Date of Patent: Aug. 14, 2018

(54) MULTI-LINK AGGREGATION METHOD AND DEVICE

(71) Applicant: Huawei Device Co., Ltd., Shenzhen (CN)

(72) Inventors: Shuhua Chen, Bonn (DE); Kai Zhang, Xi'an (CN); Haijun Wu, Shenzhen (CN)

(73) Assignee: Huawei Device Co., Ltd., Shenzhen (CN)

(*) Notice: Subject to any disclaimer, the term of this patent is extended or adjusted under 35 U.S.C. 154(b) by 182 days.

(21) Appl. No.: 14/586,734

(22) Filed: Dec. 30, 2014

(65) Prior Publication Data

US 2015/0110117 A1    Apr. 23, 2015

Related U.S. Application Data

(63) Continuation of application No. PCT/CN2014/072192, filed on Feb. 18, 2014.

(30) Foreign Application Priority Data

Feb. 28, 2013  (CN) .......................... 2013 1 0063115

(51) Int. Cl.
  *H04L 12/741*  (2013.01)
  *H04L 29/12*   (2006.01)
  *H04L 12/709*  (2013.01)

(52) U.S. Cl.
  CPC ............ *H04L 45/74* (2013.01); *H04L 45/245* (2013.01); *H04L 61/25* (2013.01); *H04L 61/2596* (2013.01); *Y02B 60/33* (2013.01)

(58) Field of Classification Search
  CPC .... H04L 61/2596; H04L 45/245; H04L 61/25
  See application file for complete search history.

(56) References Cited

U.S. PATENT DOCUMENTS

| | | | | |
|---|---|---|---|---|
| 7,388,829 B2* | 6/2008 | Sivakumar | ........ | H04L 29/12415 370/218 |
| 2005/0185587 A1 | 8/2005 | Klinker | | |

(Continued)

FOREIGN PATENT DOCUMENTS

| | | |
|---|---|---|
| CN | 1798096 A | 7/2006 |
| CN | 101026589 A | 8/2007 |

(Continued)

OTHER PUBLICATIONS

Evensen, K., et al., "A Network-Layer Proxy for Bandwidth Aggregation and Reduction of IP Packet Reordering," IEEE 34th Conference on Local Computer Networks, Oct. 20-23, 2009, 8 pages.

(Continued)

*Primary Examiner* — Yemane Mesfin
*Assistant Examiner* — Henry Baron
(74) *Attorney, Agent, or Firm* — Slater Matsil, LLP

(57) ABSTRACT

Embodiments of the present invention disclose a multi-link aggregation method, including: establishing, by a first device, a transparent transmission channel with a second device, where the transparent transmission channel spans multiple links connected to the first device and the second device; performing, by the first device, network address translation on a first target packet to obtain a second target packet; and transmitting, by the first device, the second target packet to the second device through the transparent transmission channel, so that the second device performs network address translation on the second target packet to obtain a third target packet, and the second device sends the third target packet to a target device identified by destination address information of the first target packet.

16 Claims, 19 Drawing Sheets

(56) References Cited

U.S. PATENT DOCUMENTS

2009/0040942 A1* 2/2009 Yang .................. H04L 12/2602
370/253
2015/0359033 A1* 12/2015 Stojanovski .......... H04W 74/02
370/328

FOREIGN PATENT DOCUMENTS

| CN | 101053239 A | 10/2007 |
|---|---|---|
| CN | 101119273 A | 2/2008 |
| CN | 101964785 A | 2/2011 |
| CN | 102025594 A | 4/2011 |
| CN | 102891903 A | 1/2013 |
| JP | 2012049643 A | 3/2012 |
| WO | 2006000802 A2 | 1/2006 |

OTHER PUBLICATIONS

Evensen, K. et al., "A Network-Layer Proxy for Bandwidth Aggregation and Reduction of IP Packet Reordering," 2009 IEEE 34th Conference on Local Computer Newtorks (LCN 2009), Oct. 20-23, 2009, 8 pages.

* cited by examiner

MULTI-LINK AGGREGATION METHOD AND DEVICE

This application is a continuation of International Application No. PCT/CN2014/072192, filed on Feb. 18, 2014, which claims priority to Chinese Patent Application No. 201310063115.0, filed on Feb. 28, 2013, both of which are incorporated herein by reference in their entireties.

TECHNICAL FIELD

The present invention relates to the field of communications, and in particular, to a multi-link aggregation method and a device.

BACKGROUND

Continuous development of access technologies gives rise to a situation of reality in which multiple access technologies coexist, for example, a digital subscriber line (DSL) access technology, a fiber access (Fiber-To-The-X, FTTX) technology, a Long Term Evolution (LTE) access technology, and an E1 access technology, and many network devices may support two or more access technologies simultaneously.

Currently, in the industry, multi-link aggregation is implemented mainly by establishing a virtual private network (VPN) tunnel between a user-side access device and a network-side server, that is, cross-network forwarding and aggregation of packets are implemented by using multiple access technologies simultaneously supported by a network device.

However, in an implementation process of the foregoing technologies, a packet is directly transmitted on the VPN tunnel, and the number of packet encapsulation layers and a packet length are increased. Consequently, the packet transmission efficiency in the foregoing technical solution is low, and a VPN solution further requires additional network address resources.

SUMMARY

Embodiments of the present invention provide a multi-link aggregation method and a device, which can implement multi-link aggregation and may improve the packet transmission efficiency and save network address resources.

According to a first aspect, an embodiment of the present invention provides a multi-link aggregation method, including establishing, by a first device, a transparent transmission channel with a second device, where the transparent transmission channel spans multiple links connected to the first device and the second device; performing, by the first device, network address translation on a first target packet to obtain a second target packet; and transmitting, by the first device, the second target packet to the second device through the transparent transmission channel, so that the second device performs network address translation on the second target packet to obtain a third target packet, and the second device sends the third target packet to a target device identified by destination address information of the first target packet.

In a first possible implementation manner, after the performing, by the first device, network address translation on a first target packet to obtain a second target packet, and before the transmitting, by the first device, the second target packet to the second device through the transparent transmission channel, the method further includes executing, by the first device, a link bonding policy, and selecting a target link from the links that are connected to the first device and the second device and spanned by the transparent transmission channel; and encapsulating, by the first device, the second target packet with the target link to obtain a fourth target packet. The transmitting, by the first device, the second target packet to the second device through the transparent transmission channel, includes transmitting, by the first device, the fourth target packet to the second device through the target link.

With reference to the first possible implementation manner of the first aspect, in a second possible implementation manner, the executing, by the first device, a link bonding policy, and selecting a target link from the links that are connected to the first device and the second device and spanned by the transparent transmission channel, include analyzing, by the first device, a bandwidth parameter of each link that is connected to the first device and the second device and spanned by the transparent transmission channel; and analyzing, by the first device according to the bandwidth parameter of each link, a speed and a packet length for sending to a buffer of the link, and selecting the target link from the multiple links connected to the first device and the second device. The transmitting, by the first device, the fourth target packet to the second device through the target link, includes sending, by the first device, the fourth target packet to the buffer of the target link according to the speed and packet length for sending to the buffer of the target link, and sending the fourth target packet in the buffer to the second device through the target link.

According to a second aspect, an embodiment of the present invention provides another multi-link aggregation method, including receiving, by a first device through a transparent transmission channel established in advance, a second response packet sent by a second device. The transparent transmission channel spans multiple links connected to the first device and the second device, and the second response packet is a response packet obtained by the second device by performing network address translation on a first response packet, where the first response packet is a response packet that is received by the second device from a target device and sent by the target device in response to a target packet that is sent in advance by a first device to the target device. The method further includes performing, by the first device, network address translation on the second response packet to obtain a third response packet; and sending, by the first device, the third response packet to a device identified by source address information of the target packet.

According to a third aspect, an embodiment of the present invention provides a multi-link aggregation method, including establishing, by a second device, a transparent transmission channel with a first device, where the transparent transmission channel spans multiple links connected to the second device and the first device; receiving, by the second device through the transparent transmission channel, a second target packet sent by the first device, where the second target packet is a packet obtained by the first device by performing network address translation on a first target packet; performing, by the second device, network address translation on the second target packet to obtain a third target packet; and sending, by the second device, the third target packet to a target device identified by destination address information of the first target packet.

According to a fourth aspect, an embodiment of the present invention provides a multi-link aggregation method, including performing, by a second device, network address translation on a first response packet to obtain a second response packet, where the first response packet is a response packet that is received by the second device from a target device and sent by the target device in response to a target packet that is sent in advance by a first device to the target device; and transmitting, by the second device, the second response packet to the first device through a transparent transmission channel established in advance, so that the first device performs network address translation on the second response packet to obtain a third response packet, and the first device sends the third response packet to a device identified by source address information of the target packet, where the transparent transmission channel spans multiple links connected to the first device and the second device.

In a first possible implementation manner, after the performing, by the second device, network address translation on the first response packet to obtain the second response packet, and before the sending, by the second device, the second response packet to the first device through the transparent transmission channel, the method further includes executing, by the second device, a link bonding policy, and selecting a target link from the links that are connected to the second device and the first device and spanned by the transparent transmission channel established in advance; and encapsulating, by the second device, the second response packet with the target link to obtain a fourth response packet. The sending, by the second device, the second response packet to the first device through the transparent transmission channel, includes sending, by the second device through the target link, the fourth response packet to an interface, on which the target link is established, of the first device.

With reference to the first possible implementation manner of the fourth aspect, in a second possible implementation manner, the executing, by the second device, a link bonding policy, and selecting a target link from the links that are connected to the second device and the first device and spanned by the transparent transmission channel established in advance, include receiving, by the second device, a bandwidth parameter, which is sent by the first device, of each link that is connected to the second device and the first device and spanned by the transparent transmission channel established in advance, where the bandwidth parameter of each link is a bandwidth parameter of each link obtained by the first device by analysis; and analyzing, by the second device according to the bandwidth parameter of each link, a speed and a packet length for sending to a buffer of the link, and selecting the target link from the multiple links that are connected to the second device and the first device and spanned by the transparent transmission channel established in advance. The sending, by the second device through the target link, the fourth response packet to an interface, on which the target link is established, of the first device, includes sending, by the second device, the fourth response packet to the buffer of the target link according to the speed and packet length for sending to the buffer of the target link, and sending the fourth response packet in the buffer to the interface, on which the target link is established, of the second device.

According to a fifth aspect, an embodiment of the present invention provides a network device, including an establishing unit, a translating unit, and a sending unit, where the establishing unit is configured to establish a transparent transmission channel with a second device, where the transparent transmission channel spans multiple links connected to the network device and the second device. The translating unit is configured to perform network address translation on a first target packet to obtain a second target packet. The sending unit is configured to transmit the second target packet to the second device through the transparent transmission channel, so that the second device performs network address translation on the second target packet to obtain a third target packet, and the second device sends the third target packet to a target device identified by destination address information of the first target packet.

In a first possible implementation manner, the device further includes a selecting unit configured to execute a link bonding policy, and select a target link from the links that are connected to the network device and the second device and spanned by the transparent transmission channel; and an encapsulating unit configured to encapsulate the second target packet with the target link to obtain a fourth target packet. The sending unit is further configured to transmit the fourth target packet to the second device through the target link.

With reference to the first possible implementation manner of the fifth aspect, in a second possible implementation manner, the selecting unit includes a first analyzing unit configured to analyze a bandwidth parameter of each link that is connected to the network device and the second device and spanned by the transparent transmission channel. A second analyzing unit is configured to analyze, according to the bandwidth parameter of each link, a speed and a packet length for sending to a buffer of the link, and select the target link from the multiple links connected to the network device and the second device. The sending unit is further configured to send the fourth target packet to the buffer of the target link according to the speed and packet length for sending to the buffer of the target link, and send the fourth target packet in the buffer to the second device through the target link.

According to a sixth aspect, an embodiment of the present invention provides a network device, including a receiving unit, a translating unit, and a sending unit, where the receiving unit is configured to receive, through a transparent transmission channel established in advance, a second response packet sent by a second device, where the transparent transmission channel spans multiple links connected to the first device and the second device, and the second response packet is a response packet obtained by the second device by performing network address translation on a first response packet, where the first response packet is a response packet that is received by the second device from a target device and sent by the target device in response to a target packet that is sent in advance by a first device to the target device. The translating unit is configured to perform network address translation on the second response packet to obtain a third response packet. The sending unit is configured to send the third response packet to a device identified by source address information of the target packet.

According to a seventh aspect, an embodiment of the present invention provides a network device, including an establishing unit, a receiving unit, a translating unit, and a sending unit. The establishing unit is configured to establish a transparent transmission channel with a first device, where the transparent transmission channel spans multiple links connected to the network device and the first device. The receiving unit is configured to receive, through the transparent transmission channel, a second target packet sent by the first device, where the second target packet is a packet obtained by the first device by performing network address translation on a first target packet. The translating unit is configured to perform network address translation on the second target packet to obtain a third target packet. The sending unit is configured to send the third target packet to a target device identified by destination address information of the first target packet.

According to an eighth aspect, an embodiment of the present invention provides a network device, including a translating unit and a sending unit. The translating unit is configured to perform network address translation on a first response packet to obtain a second response packet, where the first response packet is a response packet that is received by the network device from a target device and sent by the target device in response to a target packet that is sent in advance by a first device to the target device. The sending unit is configured to transmit the second response packet to the first device through a transparent transmission channel established in advance, so that the first device performs network address translation on the second response packet to obtain a third response packet, and the first device sends the third response packet to a device identified by source address information of the target packet, where the transparent transmission channel spans multiple links connected to the first device and the second device.

In a first possible implementation manner, the device further includes a selecting unit, configured to execute a link bonding policy, and select a target link from the links that are connected to the network device and the first device and spanned by the transparent transmission channel established in advance. An encapsulating unit is configured to encapsulate the second response packet with the target link to obtain a fourth response packet. The sending unit is further configured to send, through the target link, the fourth response packet to an interface, on which the target link is established, of the first device.

With reference to the first possible implementation manner of the eighth aspect, in a second possible implementation manner, the selecting unit includes a receiving subunit configured to receive a bandwidth parameter, which is sent by the first device, of each link that is connected to the network device and the first device and spanned by the transparent transmission channel established in advance, where the bandwidth parameter of each link is a bandwidth parameter of each link obtained by the first device by analysis. An analyzing unit is configured to analyze, according to the bandwidth parameter of each link, a speed and a packet length for sending to a buffer of the link, and select the target link from the multiple links that are connected to the second device and the first device and spanned by the transparent transmission channel established in advance. The sending unit is further configured to send the fourth response packet to the buffer of the target link according to the speed and packet length for sending to the buffer of the target link, and send the fourth response packet in the buffer to the interface, on which the target link is established, of the second device.

In the foregoing technical solutions, a first device establishes a transparent transmission channel with a second device, where the transparent transmission channel spans multiple links connected to the first device and the second device; the first device performs network address translation on a first target packet to obtain a second target packet; and the first device transmits the second target packet to the second device through the transparent transmission channel, so that the second device performs network address translation on the second target packet to obtain a third target packet, and the second device sends the third target packet to a target device identified by destination address information of the first target packet. In this way, network address translation is performed when a packet is transmitted between the first device and the second device, which saves network address resources, reduces the number of target packet encapsulation layers, and thereby improves the packet transmission efficiency.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
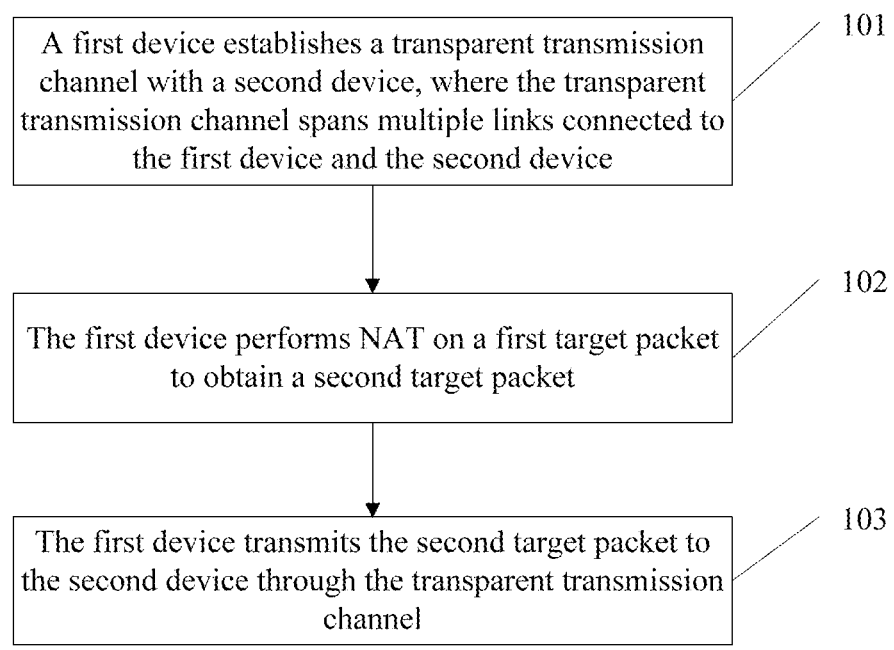
FIG. 1 is a schematic flowchart of a multi-link aggregation method according to an embodiment of the present invention.

FIG. 1 is a schematic flowchart of a multi-link aggregation method according to an embodiment of the present invention. As shown in FIG. 1, the method includes the following.

101. A first device establishes a transparent transmission channel with a second device, where the transparent transmission channel spans multiple links connected to the first device and the second device.

102. The first device performs network address translation (NAT) on a first target packet to obtain a second target packet.

103. The first device transmits the second target packet to the second device through the transparent transmission channel, so that the second device performs NAT on the second target packet to obtain a third target packet, and the second device sends the third target packet to a target device identified by destination address information of the first target packet.

Optionally, when receiving the second target packet, the second device may perform NAT on the packet, and send a packet obtained through translation to the target device.

Optionally, the first device may include but is not limited to any one of the following devices: an access device, a gateway device (for example, a DSL gateway), a server, and a user equipment (for example, a mobile phone).

Optionally, the second device may include but is not limited to any one of the following devices: an access device, a gateway device (for example, a DSL gateway), a server, and a user equipment (for example, a mobile phone).

However, the first device and the second device are two different devices. For example, when the first device is an access device, the second device may be a server; when the first device is a server, the second device may be an access device, a gateway device, or a user equipment; when the first device is a user-side device, the second device may be an access device, a gateway device, or a server.

Optionally, the links between the first device and the second device include but are not limited to any one of the following links: a DSL link, an LTE link, an FTTX link, an E1 link, a Global System of Mobile communication (GSM) link, a cable link, a fiber optic link, and so on.

Optionally, the transparent transmission channel includes but is not limited to any one of the following channels: a VPN tunnel, a generic routing encapsulation (GRE) tunnel, a point-to-point transmission channel, and so on.

Optionally, the first target packet may be one or more packets.

In the foregoing technical solution, a first device establishes a transparent transmission channel with a second device, where the transparent transmission channel spans multiple links connected to the first device and the second device; the first device performs NAT on a first target packet to obtain a second target packet; and the first device transmits the second target packet to the second device through the transparent transmission channel, so that the second device performs NAT on the second target packet to obtain a third target packet, and the second device sends the third target packet to a target device identified by destination address information of the first target packet. In this way, NAT is performed when a packet is transmitted between the first device and the second device. Therefore, network address resources are saved, a fast forwarding capability of a router on a transmission path may be used, and thereby packet transmission efficiency may be improved.

Figure 2:
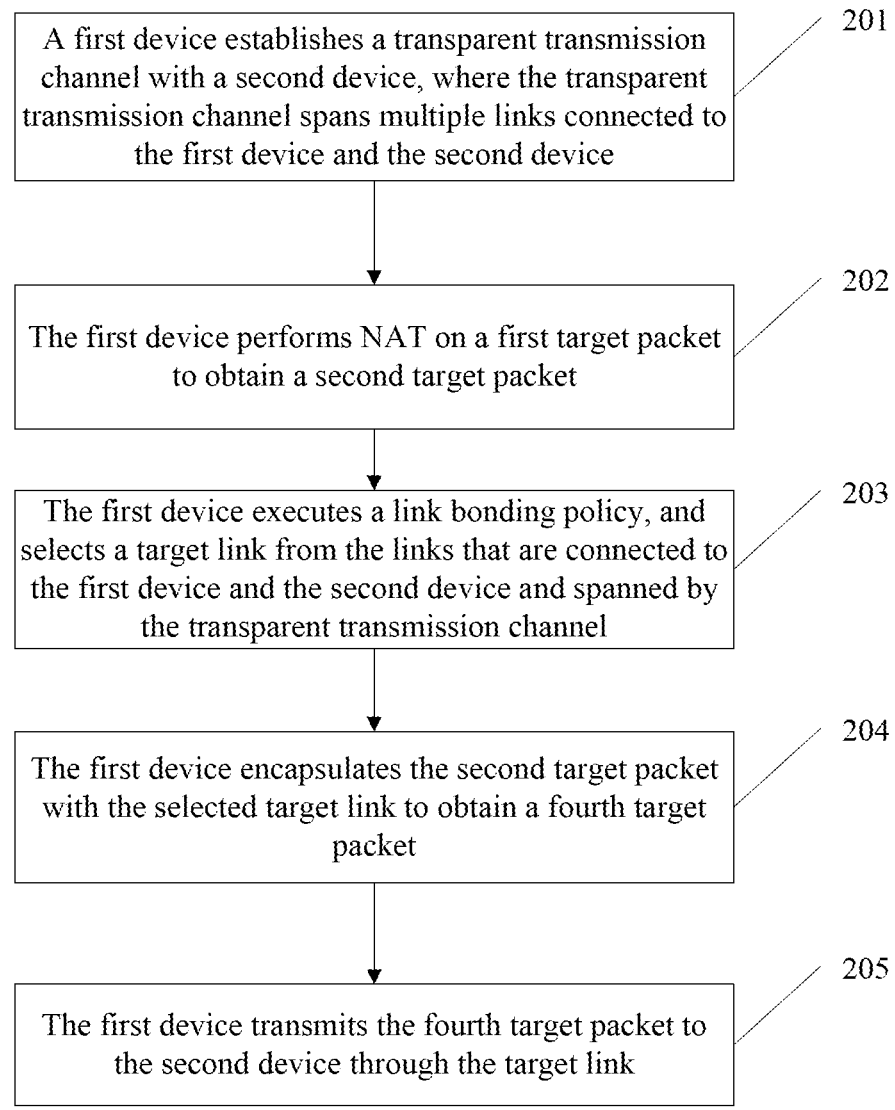
FIG. 2 is a schematic flowchart of another multi-link aggregation method according to an embodiment of the present invention.

FIG. 2 is a schematic flowchart of another multi-link aggregation method according to an embodiment of the present invention. As shown in FIG. 2, the method includes the following.

201. A first device establishes a transparent transmission channel with a second device, where the transparent transmission channel spans multiple links connected to the first device and the second device.

Optionally, the spanning may indicate that the transparent transmission channel is borne on the multiple links connected to the first device and the second device, and that a packet of a source point of the transparent transmission channel may be transmitted to an end point of the transparent transmission channel through any link that the transparent transmission channel spans.

202. The first device performs NAT on a first target packet to obtain a second target packet.

Optionally, the first target packet may be an uplink packet. Optionally, the first target packet may be one or more packets sent by a user-side device (for example, a home terminal or a mobile terminal), and the first device is an access device or a gateway device.

Optionally, the first target packet may be a downlink packet. Optionally, the first target packet may be one or more packets sent by an Internet device, and the first device is an aggregation server.

Optionally, the NAT may translate source address information and source port information of the first target packet into address information and port information of the first device.

203. The first device executes a link bonding policy (for example, a Link Channel Policy), and selects a target link from the links that are connected to the first device and the second device and spanned by the transparent transmission channel.

204. The first device encapsulates the second target packet with the selected target link to obtain a fourth target packet.

205. The first device transmits the fourth target packet to the second device through the target link, so that the second device decapsulates the fourth target packet to obtain a third target packet, and that the second device sends the third target packet to a target device identified by destination address information of the first target packet.

Optionally, that the first device performs NAT on a first target packet may be that the first device translates the source address information and source port information of the first target packet into the address information and port information of the first device.

Optionally, that the second device restores and obtains a third target packet may be that the fourth target packet is decapsulated to obtain the second target packet; and that the second device translates source address information and source port information of the second target packet into address information and port information of the second device, the second device translates source address information and source port information of the second target packet into address information and port information of the second device may be that the source address information and source port information of the second target packet are translated into public IP address information and public network port information of the second device respectively.

The following uses a DSL link and an LTE link as an example for detailed description. Certainly, in the embodiment of the present invention, the links connected to the first device and the second device include but are not limited to the DSL link and LTE link. The link bonding policy is executed in step 203. For example, if a DSL link is selected as a target link, the second target packet is encapsulated in step 204. A part of the encapsulation may be adding address information and port information of a DSL interface of the first device to obtain the fourth target packet, and in step 205, the fourth target packet is sent to the second device through the DSL link.

Optionally, address information and port information in the first target packet, second target packet, third target packet, and fourth target packet may be shown in the following table:

TABLE 1

|  | Source address | Source port | Destination address | Destination port |
|---|---|---|---|---|
| First target packet | IP1 | 1022 | IPE | 8088 |

TABLE 1-continued

|  | Source address | Source port | Destination address | Destination port |
|---|---|---|---|---|
| Second target packet | IP A/B | 2345 | IPE | 8088 |
| Fourth target packet (DSL) | IPA | 2345 | IPE | 8088 |
| Fourth target packet (LTE) | IPB | 2345 | IPE | 8088 |
| Third target packet | IPD01 | 4344 | IPE | 8088 |

Table 1 may clearly describe a relationship between address information and port information in the foregoing several packets.

NAT of the first device and second device may be shown in the following Table 2 and Table 3 respectively. Certainly, this is only an example in the embodiment of the present invention.

TABLE 2

| Source IP | Source port | Destination IP | Destination port | IP obtained through NAT translation | Port obtained through NAT translation |
|---|---|---|---|---|---|
| 192.168.2.5 | 1022 | IP E | 8088 | IP A/B | 2345 |
| 192.168.2..10 | 2344 | IP E | 8088 | IP A/B | 2346 |

TABLE 3

| Source IP | Source port | Destination IP | Destination port | IP obtained through NAT translation | Port obtained through NAT translation |
|---|---|---|---|---|---|
| IP A/B | 2345 | IP E | 8088 | IP D01 | 4344 |
| IP C/D | 5678 | IP E | 8088 | IP D01 | 4345 |

In an optional implementation manner, the step of executing a link bonding policy in step 203 may include analyzing, by the first device, a bandwidth parameter of each link that is connected to the first device and the second device and spanned by the transparent transmission channel; and analyzing, by the first device according to the bandwidth parameter of each link, a speed and a packet length for sending to a buffer of the link, and selecting the target link from the multiple links connected to the first device and the second device.

Step 205 may include sending, by the first device, the fourth target packet to the buffer of the target link according to the speed and packet length for sending to the buffer of the target link, and sending the fourth target packet in the buffer to the second device through the target link.

Optionally, the bandwidth parameter includes at least one of the following a packet transmission rate, a packet transmission delay, a packet transmission jitter, and a buffer queue length.

Optionally, the analyzing, by the first device according to the bandwidth parameter of each link, a speed and a packet length for sending to a buffer of the link may be that the speed and packet length for sending to the buffer of the link may be proportional to a bandwidth parameter of the link, that is, if the bandwidth parameter is better (for example, the packet transmission rate is higher, the packet transmission delay is shorter, the packet transmission jitter is smaller, and the buffer queue length is shorter), the speed of the buffer of the link is higher and the packet length is longer. In step 205, the second target packet is sent to the buffer of the target link according to the speed and packet length for sending to the buffer of the target link.

In an optional implementation manner, the analyzing, by the first device, a bandwidth parameter of each link, may include receiving, by the first device, a bandwidth parameter, which is sent by a third device, of a second network link between the first device and the second device, where the third device is a device of a second network, and the first device is a device of a first network.

The second device analyzes a bandwidth parameter of a first network link between the first device and the second device.

Optionally, in this implementation manner, multiple devices may jointly analyze bandwidth parameters of links between the first device and the second device. Optionally, the first network and second network may be one or more networks. For example, the first device is a DSL gateway, and the third device is an LTE mobile phone, that is, the first network is a DSL network, and the second network is an LTE network. In this way, the first device may send a packet to the second device through the first network and second network separately.

In the foregoing technical solution, on a basis of the foregoing embodiment, multiple implementation manners of packet transmission are mainly described. In all the implementation manners, the number of encapsulation layers is small, implementation is based on standard, and a packet transmission rate may be improved.

Figure 3:
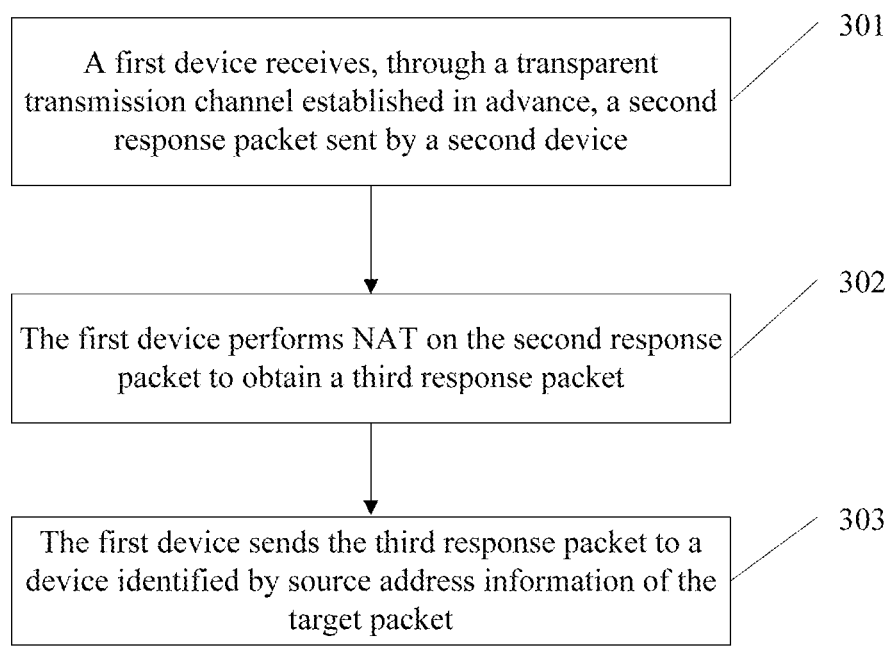
FIG. 3 is a schematic flowchart of another multi-link aggregation method according to an embodiment of the present invention.

FIG. 3 is a schematic flowchart of a multi-link aggregation method according to an embodiment of the present invention. As shown in FIG. 3, the method includes the following.

301. A first device receives, through a transparent transmission channel established in advance, a second response packet sent by a second device, where the transparent transmission channel spans multiple links connected to the first device and the second device, and the second response packet is a response packet obtained by the second device by performing NAT on a first response packet, where the first response packet is a response packet that is received by the second device from a target device and sent by the target device in response to a target packet that is sent in advance by a first device to the target device.

302. The first device performs NAT on the second response packet to obtain a third response packet.

303. The first device sends the third response packet to a device identified by source address information of the target packet.

Optionally, the transparent transmission channel may refer to the transparent transmission channel described in the foregoing embodiment.

Optionally, the first device may include but is not limited to any one of the following devices: an access device, a gateway device (for example, a DSL gateway), a server, and a user equipment (for example, a mobile phone).

Optionally, the second device may include but is not limited to any one of the following devices: an access device, a gateway device (for example, a DSL gateway), a server, and a user equipment (for example, a mobile phone).

However, the first device and the second device are two different devices. For example, when the first device is an access device, the second device may be a server; when the first device is a server, the second device may be an access device, a gateway device, or a user equipment; when the first device is a user-side device, the second device may be an access device, a gateway device, or a server.

Optionally, the links between the first device and the second device include but are not limited to any one of the following links: a DSL link, an LTE link, an FTTX link, an E1 link, a GSM link, a cable link, a fiber optic link, and so on.

Optionally, the transparent transmission channel includes but is not limited to any one of the following channels: a VPN tunnel, a GRE tunnel, a point-to-point transmission channel, and so on.

Optionally, the first target packet may be one or more packets.

Optionally, that the second device performs NAT on a first response packet may be that destination address information and destination port information of the first response packet are translated into address information and port information of the first device.

Optionally, that the first device performs NAT on the second response packet may be that destination address information and destination port information of the second response packet are translated into source address information and source port information of the target packet.

In the foregoing technical solution, a first device receives, through a transparent transmission channel established in advance, a second response packet sent by a second device, where the transparent transmission channel spans multiple links connected to the first device and the second device, and the second response packet is a response packet obtained by the second device by performing NAT on a first response packet, where the first response packet is a response packet that is received by the second device from a target device and sent by the target device in response to a target packet that is sent in advance by a first device to the target device; the first device performs NAT on the second response packet to obtain a third response packet; and the first device sends the third response packet to a device identified by source address information of the target packet. In this way, NAT is performed when a packet is transmitted between the first device and the second device. Therefore, network address resources are saved, a fast forwarding capability of a router on a transmission path may be used, and thereby packet transmission efficiency may be improved.

Figure 4:
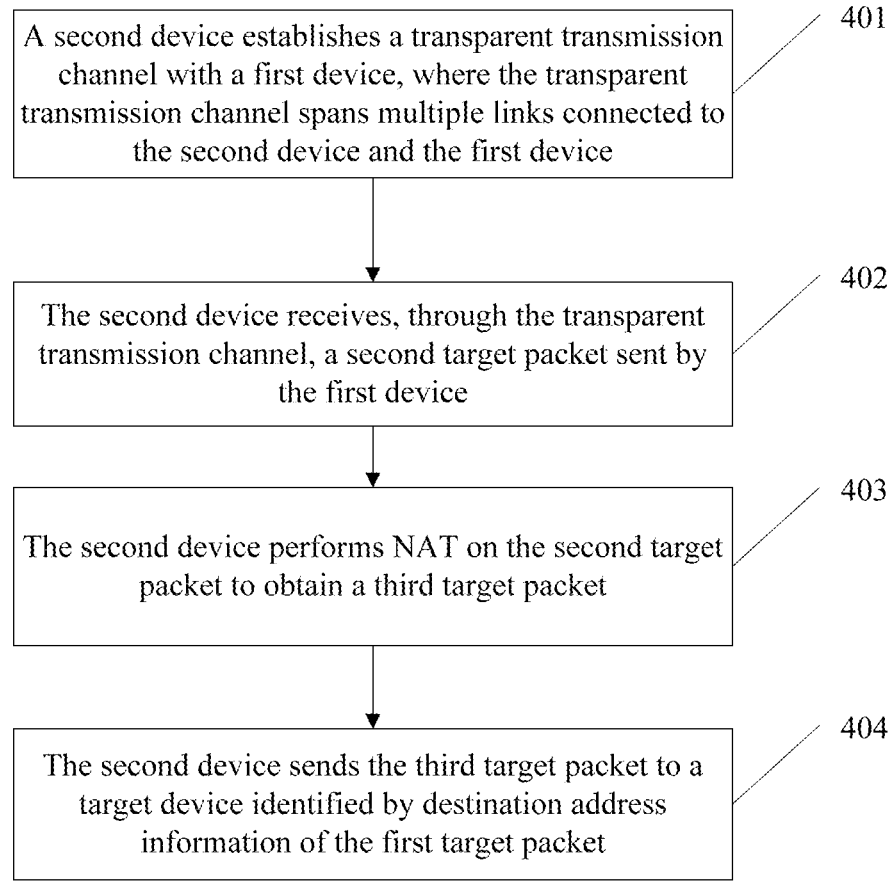
FIG. 4 is a schematic flowchart of another multi-link aggregation method according to an embodiment of the present invention.

FIG. 4 is a schematic flowchart of a multi-link aggregation method according to an embodiment of the present invention. As shown in FIG. 4, the method includes the following.

401. A second device establishes a transparent transmission channel with a first device, where the transparent transmission channel spans multiple links connected to the second device and the first device.

402. The second device receives, through the transparent transmission channel, a second target packet sent by the first device, where the second target packet is a packet obtained by the first device by performing NAT on a first target packet.

403. The second device performs NAT on the second target packet to obtain a third target packet.

404. The second device sends the third target packet to a target device identified by destination address information of the first target packet.

Optionally, the first device may include but is not limited to any one of the following devices: an access device, a gateway device (for example, a DSL gateway), a server, and a user equipment (for example, a mobile phone).

Optionally, the second device may include but is not limited to any one of the following devices: an access device, a gateway device (for example, a DSL gateway), a server, and a user equipment (for example, a mobile phone).

However, the first device and the second device are two different devices. For example, when the first device is an access device, the second device may be a server; when the first device is a server, the second device may be an access device, a gateway device, or a user equipment; when the first device is a user-side device, the second device may be an access device, a gateway device, or a server.

Optionally, the links between the first device and the second device include but are not limited to any one of the following links: a DSL link, an LTE link, an FTTX link, an E1 link, a GSM link, a cable link, a fiber optic link, and so on.

Optionally, the transparent transmission channel includes but is not limited to any one of the following channels: a VPN tunnel, a GRE tunnel, a point-to-point transmission channel, and so on.

Optionally, the first target packet may be one or more packets.

Optionally, that the first device performs NAT on a first target packet may be that source address information and source port information of the first target packet are translated into address information and port information of the first device.

Optionally, that the second device performs NAT on the second target packet may be that source address information and source port information of the second target packet are translated into address information and port information of the second device.

In the foregoing technical solution, a second device establishes a transparent transmission channel with a first device, where the transparent transmission channel spans multiple links connected to the second device and the first device; the second device receives, through the transparent transmission channel, a second target packet sent by the first device, where the second target packet is a packet obtained by the first device by performing NAT on a first target packet; the second device performs NAT on the second target packet to obtain a third target packet; and the second device sends the third target packet to a target device identified by destination address information of the first target packet. In this way, NAT is performed when a packet is transmitted between the first device and the second device. Therefore, network address resources are saved, a fast forwarding capability of a router on a transmission path may be used, and thereby packet transmission efficiency may be improved.

Figure 5:
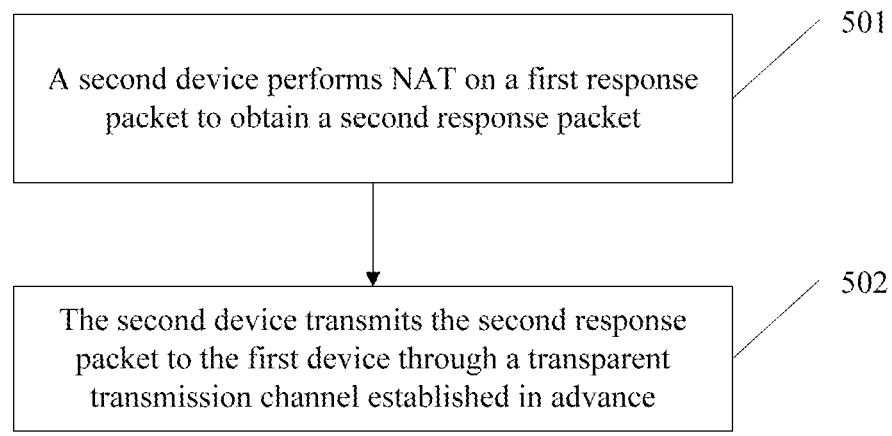
FIG. 5 is a schematic flowchart of another multi-link aggregation method according to an embodiment of the present invention.

FIG. 5 is a schematic flowchart of a multi-link aggregation method according to an embodiment of the present invention. As shown in FIG. 5, the method includes the following.

501. A second device performs NAT on a first response packet to obtain a second response packet, where the first response packet is a response packet that is received by the second device from a target device and sent by the target device in response to a target packet that is sent in advance by a first device to the target device.

502. The second device transmits the second response packet to the first device through a transparent transmission channel established in advance, so that the first device performs NAT on the second response packet to obtain a third response packet, and the first device sends the third response packet to a device identified by source address information of the target packet, where the transparent transmission channel spans multiple links connected to the first device and the second device.

Optionally, the transparent transmission channel may refer to the transparent transmission channel described in the foregoing embodiment.

Optionally, the first device may include but is not limited to any one of the following devices: an access device, a gateway device (for example, a DSL gateway), a server, and a user equipment (for example, a mobile phone).

Optionally, the second device may include but is not limited to any one of the following devices: an access device, a gateway device (for example, a DSL gateway), a server, and a user equipment (for example, a mobile phone).

However, the first device and the second device are two different devices. For example, when the first device is an access device, the second device may be a server; when the first device is a server, the second device may be an access device, a gateway device, or a user equipment; when the first device is a user-side device, the second device may be an access device, a gateway device, or a server.

Optionally, the links between the first device and the second device include but are not limited to any one of the following links: a DSL link, an LTE link, an FTTX link, an E1 link, a GSM link, a cable link, a fiber optic link, and so on.

Optionally, the transparent transmission channel includes but is not limited to any one of the following channels: a VPN tunnel, a GRE tunnel, a point-to-point transmission channel, and so on.

Optionally, the first target packet may be one or more packets.

In the foregoing technical solution, a second device performs NAT on a first response packet to obtain a second response packet, where the first response packet is a response packet that is received by the second device from a target device and sent by the target device in response to a target packet that is sent in advance by a first device to the target device; and the second device transmits the second response packet to the first device through a transparent transmission channel established in advance, so that the first device performs NAT on the second response packet to obtain a third response packet, and the first device sends the third response packet to a device identified by source address information of the target packet, where the transparent transmission channel spans multiple links connected to the first device and the second device. In this way, NAT is performed when a packet is transmitted between the first device and the second device. Therefore, network address resources are saved, a fast forwarding capability of a router on a transmission path may be used, and thereby packet transmission efficiency may be improved.

Figure 6:
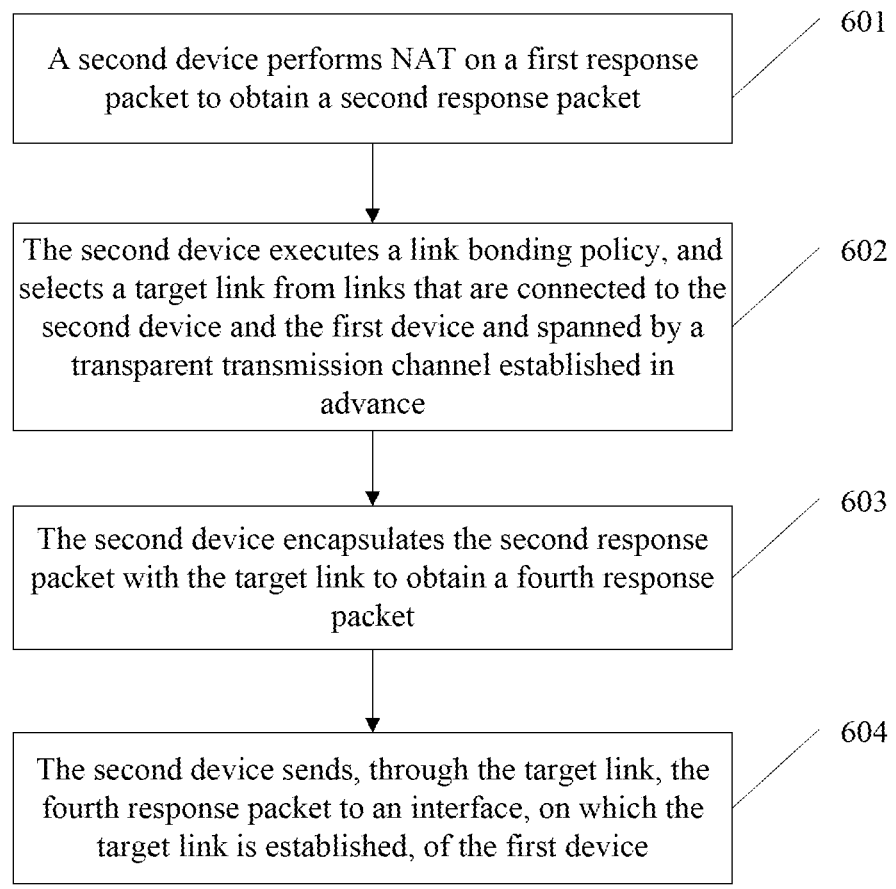
FIG. 6 is a schematic flowchart of another multi-link aggregation method according to an embodiment of the present invention.

FIG. 6 is a schematic flowchart of a multi-link aggregation method according to an embodiment of the present invention. As shown in FIG. 6, the method includes the following.

601. A second device performs NAT on a first response packet to obtain a second response packet, where the first response packet is a response packet that is received by the second device from a target device and sent by the target device in response to a target packet that is sent in advance by a first device to the target device.

602. The second device executes a link bonding policy, and selects a target link from links that are connected to the second device and the first device and spanned by a transparent transmission channel established in advance, where the transparent transmission channel spans multiple links connected to the first device and the second device.

603. The second device encapsulates the second response packet with the target link to obtain a fourth response packet.

604. The second device sends, through the target link, the fourth response packet to an interface, on which the target link is established, of the first device, obtainso that the first device decapsulates the fourth response packet to obtain a third response packet, and the first device sends the third response packet to a device identified by source address information of the target packet.

Optionally, that a second device performs NAT on a first response packet may be that destination address information and destination port information of the first response packet are translated into address information and port information of the first device.

Optionally, that the first device performs NAT on the second response packet may be that destination address information and destination port information of the second response packet are translated into source address information and source port information of the target packet.

In an implementation manner, step 602 may include receiving, by the second device, a bandwidth parameter, which is sent by the first device, of each link that is connected to the second device and the first device and spanned by the transparent transmission channel established in advance, where the bandwidth parameter of each link is a bandwidth parameter of each link obtained by the first device by analysis; and analyzing, by the second device according to the bandwidth parameter of each link, a speed and a packet length for sending to a buffer of the link, and selecting the target link from the multiple links that are connected to the second device and the first device and spanned by the transparent transmission channel established in advance.

Step 604 may include sending, by the second device, the fourth response packet to the buffer of the target link according to the speed and packet length for sending to the buffer of the target link, and sending the fourth response packet in the buffer to the interface, on which the target link is established, of the second device.

Optionally, address information and port information in the first response packet, second response packet, third response packet, and fourthresponse target packet may be shown in the following table:

TABLE 4

|  | Source address | Source port | Destination address | Destination port |
|---|---|---|---|---|
| First response packet | IPE | 8088 | IPD01 | 4344 |
| Second response packet | IPE | 8088 | IPA/B | 2345 |
| Fourth response packet (DSL) | IPE | 8088 | IPA | 2345 |
| Fourth response packet (LTE) | IPE | 8088 | IPB | 2345 |
| Third response packet | IPE | 8088 | IP1 | 1022 |

In the foregoing technical solution, on a basis of the foregoing embodiment, multiple implementation manners of packet transmission are mainly described. In all the implementation manners, standard-based NAT translation and encapsulation are performed, and a packet forwarding rate may be improved.

Figure 7:
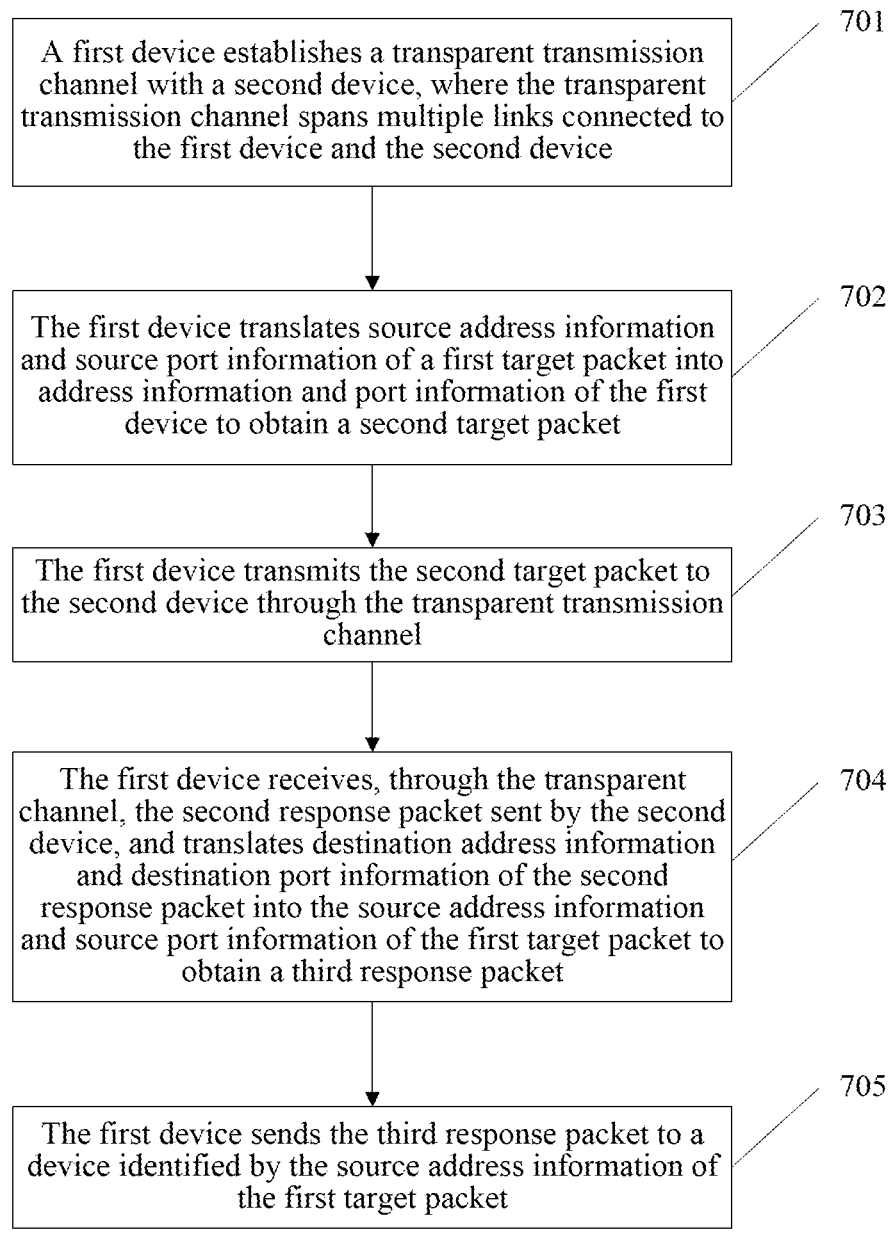
FIG. 7 is a schematic flowchart of another multi-link aggregation method according to an embodiment of the present invention.

FIG. 7 is a schematic flowchart of a multi-link aggregation method according to an embodiment of the present invention. As shown in FIG. 7, the method includes the following.

701. A first device establishes a transparent transmission channel with a second device, where the transparent transmission channel spans multiple links connected to the first device and the second device.

702. The first device translates source address information and source port information of a first target packet into address information and port information of the first device to obtain a second target packet.

703. The first device transmits the second target packet to the second device through the transparent transmission channel, so that the second device translates source address information and source port information of the second target packet into address information and port information of the second device to obtain a third target packet, the second device sends the third target packet to a target device identified by destination address information of the first target packet, the second device receives a first response packet sent by the target device, and the second device translates destination address information and destination port information of the first response packet into the address information and port information of the first device to obtain a second response packet, where the first response packet is a response packet sent by the target device according to the third target packet.

704. The first device receives, through the transparent transmission channel, the second response packet sent by the second device, and translates destination address information and destination port information of the second response packet into the source address information and source port information of the first target packet to obtain a third response packet.

705. The first device sends the third response packet to a device identified by the source address information of the first target packet.

In the foregoing technical solution, a first device establishes a transparent transmission channel with a second device, where the transparent transmission channel spans multiple links connected to the first device and the second device; the first device translates source address information and source port information of a first target packet into address information and port information of the first device to obtain a second target packet; the first device transmits the second target packet to the second device through the transparent transmission channel, so that the second device translates source address information and source port information of the second target packet into address information and port information of the second device to obtain a third target packet, the second device sends the third target packet to a target device identified by destination address information of the first target packet, the second device receives a first response packet sent by the target device, and the second device translates destination address information and destination port information of the first response packet into the address information and port information of the first device to obtain a second response packet, where the first response packet is a response packet sent by the target device according to the third target packet; the first device receives, through the transparent transmission channel, the second response packet sent by the second device, and translates destination address information and destination port information of the second response packet into the source address information and source port information of the first target packet to obtain a third response packet; and the first device sends the third response packet to a device identified by the source address information of the first target packet. In this way, NAT is performed when a packet is transmitted between the first device and the second device.

Therefore, network address resources are saved, a fast forwarding capability of a router on a transmission path may be used, and thereby packet transmission efficiency may be improved.

Figure 8:
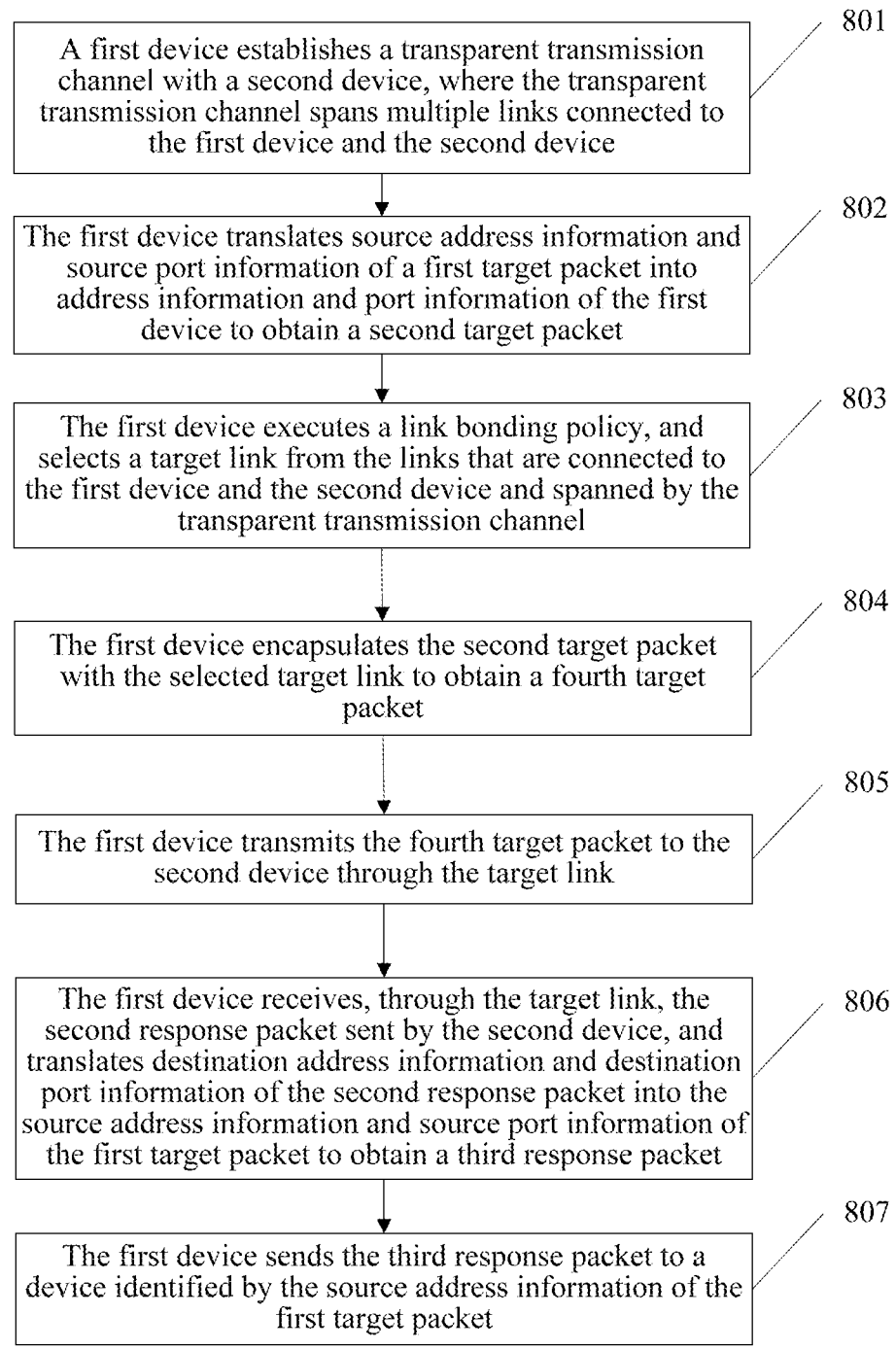
FIG. 8 is a schematic flowchart of another multi-link aggregation method according to an embodiment of the present invention.

FIG. 8 is a schematic flowchart of another multi-link aggregation method according to an embodiment of the present invention. As shown in FIG. 8, the method includes the following.

801. A first device establishes a transparent transmission channel with a second device, where the transparent transmission channel spans multiple links connected to the first device and the second device.

802. The first device translates source address information and source port information of a first target packet into address information and port information of the first device to obtain a second target packet.

Optionally, the first target packet may be an uplink packet. Optionally, the first target packet may be one or more packets sent by a user-side device (for example, a home terminal or a mobile terminal), and the first device is an access device or a gateway device.

Optionally, the first target packet may be a downlink packet. Optionally, the first target packet may be one or more packets sent by an Internet device, and the first device is an aggregation server.

803. The first device executes a link bonding policy (for example, a Link Channel Policy), and selects a target link from the links that are connected to the first device and the second device and spanned by the transparent transmission channel.

804. The first device encapsulates the second target packet with the selected target link to obtain a fourth target packet.

805. The first device transmits the fourth target packet to the second device through the target link, obtain so that the second device decapsulates the fourth target packet to obtain a third target packet, the second device sends the third target packet to a target device identified by destination address information of the first target packet, the second device receives a first response packet sent by the target device, and the second device translates destination address information and destination port information of the first response packet into the address information and port information of the first device to obtain a second response packet, where the first response packet is sent by the target device according to the third target packet.

806. The first device receives, through the target link, second response packet sent by the second device, and translates destination address information and destination port information of the second response packet into the source address information and source port information of the first target packet to obtain a third response packet.

807. The first device sends the third response packet to a device identified by the source address information of the first target packet.

Optionally, that the second device translates source address information and source port information of the second target packet into address information and port information of the second device may be that the source address information and source port information of the second target packet are respectively translated into public IP address information and public network port information of the second device.

The following uses a DSL link and an LTE link as an example for detailed description. Certainly, in the embodiment of the present invention, the links connected to the first device and the second device include but are not limited to the DSL link and LTE link. The link bonding policy is executed in step 803. For example, if a DSL link is selected as a target link, the second target packet is encapsulated in step 804. A part of the encapsulation may be adding address information and port information of a DSL interface of the first device to obtain the fourth target packet, and in step 805, the fourth target packet is sent to the second device through the DSL link.

In the foregoing technical solution, on a basis of the foregoing embodiment, multiple implementation manners of packet transmission are mainly described. In all the implementation manners, the number of encapsulation layers is small, implementation is based on standard, and a packet transmission rate may be improved.

Figure 9:
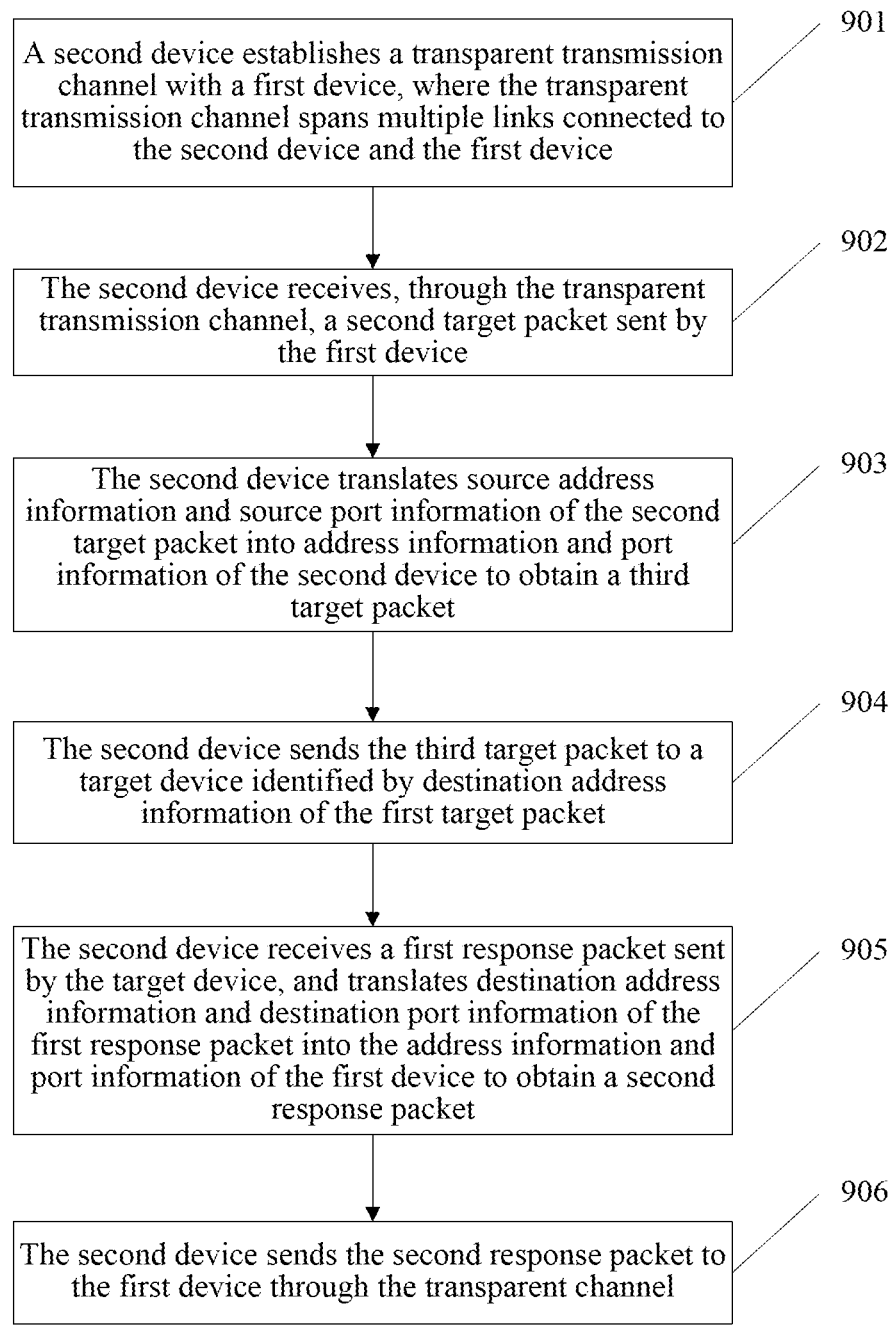
FIG. 9 is a schematic flowchart of another multi-link aggregation method according to an embodiment of the present invention.

FIG. 9 is a schematic flowchart of another multi-link aggregation method according to an embodiment of the present invention. As shown in FIG. 9, the method includes the following.

901. A second device establishes a transparent transmission channel with a first device, where the transparent transmission channel spans multiple links connected to the second device and the first device.

902. The second device receives, through the transparent transmission channel, a second target packet sent by the first device, where the second target packet is a packet obtained by the first device by translating source address information and source port information of a first target packet into address information and port information of the first device.

903. The second device translates source address information and source port information of the second target packet into address information and port information of the second device to obtain a third target packet.

904. The second device sends the third target packet to a target device identified by destination address information of the first target packet.

905. The second device receives a first response packet sent by the target device, and translates destination address information and destination port information of the first response packet into the address information and port information of the first device to obtain a second response packet, where the first response packet is a response packet sent by the target device according to the third target packet.

906. The second device sends the second response packet to the first device through the transparent transmission channel, so that the first device translates destination address information and destination port information of the second response packet into the source address information and source port information of the first target packet to obtain a third response packet, and the first device sends the third response packet to a device identified by the source address information of the first target packet.

In the foregoing technical solution, a second device establishes a transparent transmission channel with a first device, where the transparent transmission channel spans multiple links connected to the second device and the first device; the second device receives, through the transparent transmission channel, a second target packet sent by the first device, where the second target packet is a packet obtained by the first device by translating source address information and source port information of a first target packet into address information and port information of the first device; the second device translates source address information and source port information of the second target packet into address information and port information of the second device to obtain a third target packet; the second device sends the third target packet to a target device identified by destination address information of the first target packet; the second device receives a first response packet sent by the target device, and translates destination address information and destination port information of the first response packet into the address information and port information of the first device to obtain a second response packet, where the first response packet is a response packet sent by the target device according to the third target packet; and the second device sends the second response packet to the first device through the transparent transmission channel, so that the first device translates destination address information and destination port information of the second response packet into the source address information and source port information of the first target packet to obtain a third response packet, and the first device sends the third response packet to a device identified by the source address information of the first target packet. In this way, NAT is performed when a packet is transmitted between the first device and the second device, and thereby packet transmission efficiency may be improved.

Figure 10:
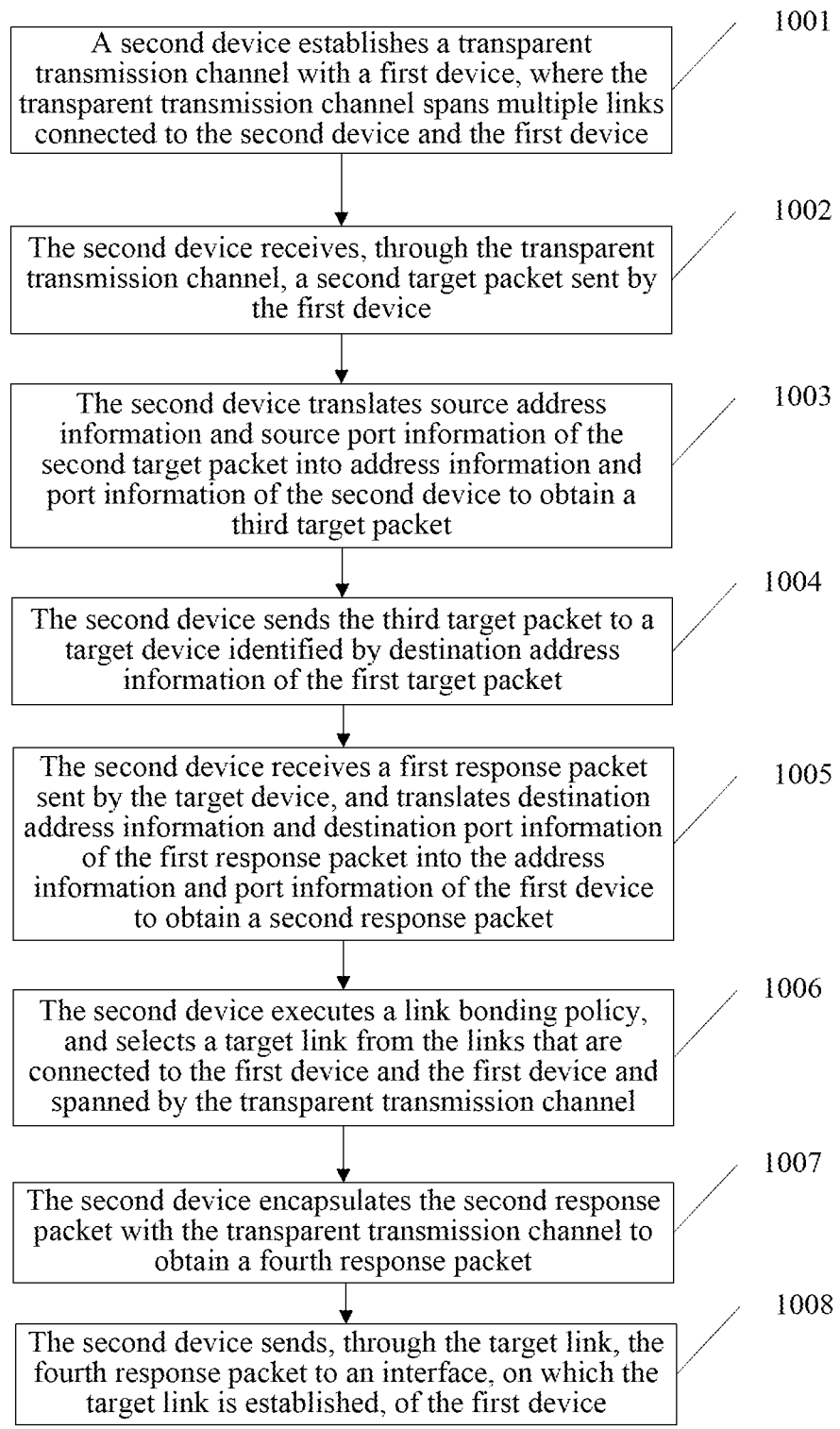
FIG. 10 is a schematic flowchart of another multi-link aggregation method according to an embodiment of the present invention.

FIG. 10 is a schematic flowchart of another multi-link aggregation method according to an embodiment of the present invention. As shown in FIG. 10, the method includes the following.

1001. A second device establishes a transparent transmission channel with a first device, where the transparent transmission channel spans multiple links connected to the second device and the first device.

1002. The second device receives, through the transparent transmission channel, a second target packet sent by the first device, where the second target packet is a packet obtained by the first device by translating source address information and source port information of a first target packet into address information and port information of the first device.

Optionally, the first target packet may be an uplink packet. Optionally, the first target packet may be one or more packets sent by a user-side device (for example, a home terminal or a mobile terminal), the first device is an access device or a gateway device, and the second device is an aggregation server.

Optionally, the first target packet may be a downlink packet. Optionally, the first target packet may be one or more packets sent by an Internet device, the first device is an aggregation server, and the second device is an access device or a gateway device.

1003. The second device translates source address information and source port information of the second target packet into address information and port information of the second device to obtain a third target packet.

1004. The second device sends the third target packet to a target device identified by destination address information of the first target packet.

1005. The second device receives a first response packet sent by the target device, and translates destination address information and destination port information of the first response packet into the address information and port information of the first device to obtain a second response packet, where the first response packet is a response packet sent by the target device according to the third target packet.

1006. The second device executes a link bonding policy, and selects a target link from the links that are connected to the second device and the first device and spanned by the transparent transmission channel.

1007. The second device encapsulates the second response packet with the target link to obtain a fourth response packet.

1008. The second device sends, through the target link, the fourth response packet to an interface, on which the target link is established, of the first device, obtainso that the first device decapsulates the fourth response packet to obtain a third response packet, and the first device sends the third response packet to a device identified by the source address information of the first target packet.

In the foregoing technical solution, on a basis of the foregoing embodiment, multiple implementation manners of packet transmission are mainly described. In all the implementation manners, standard-based NAT translation and encapsulation are performed, and a packet forwarding rate may be improved.

Figure 11:
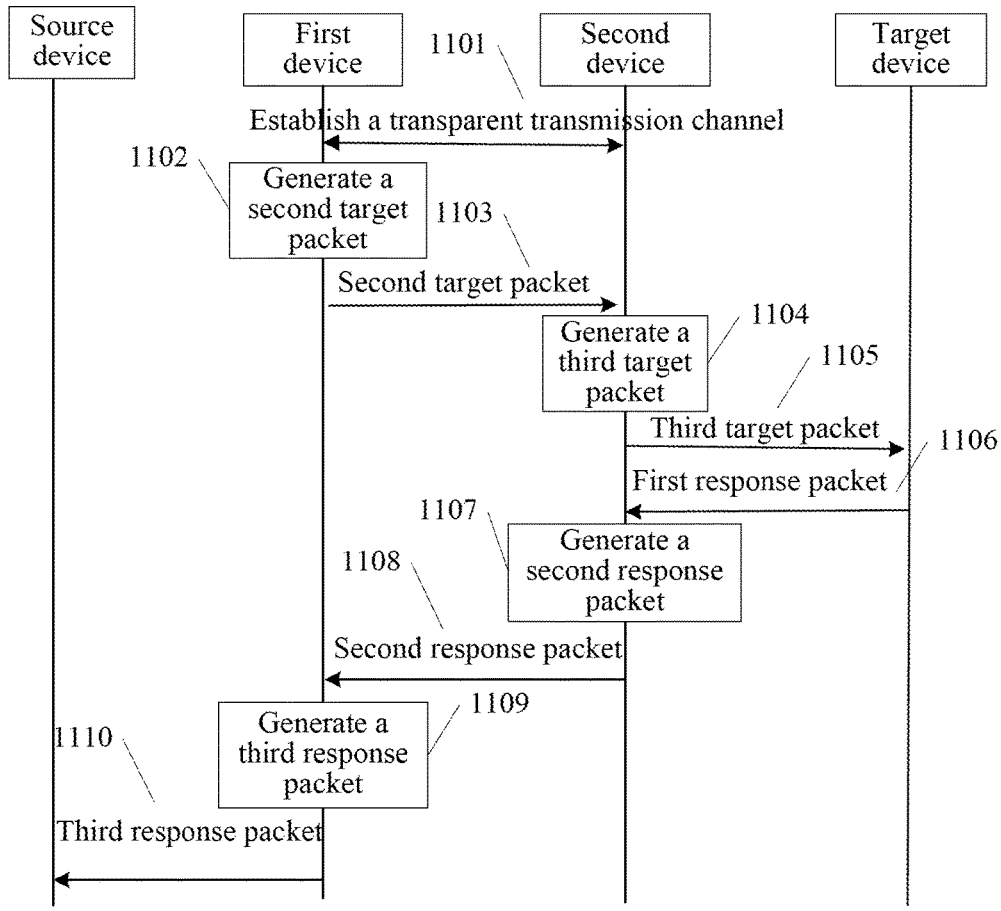
FIG. 11 is a schematic flowchart of another multi-link aggregation method according to an embodiment of the present invention.

FIG. 11 is a schematic flowchart of another multi-link aggregation method according to an embodiment of the present invention. As shown in FIG. 11, the method includes the following.

1101. A first device establishes a transparent transmission channel with a second device, where the transparent transmission channel spans multiple links connected to the first device and the second device.

1102. The first device translates source address information and source port information of a first target packet into address information and port information of the first device to obtain a second target packet.

1103. The first device transmits the second target packet to the second device through the transparent transmission channel.

1104. The second device translates source address information and source port information of the second target packet into address information and port information of the second device to obtain a third target packet.

1105. The second device sends the third target packet to a target device identified by destination address information of the first target packet.

1106. The second device receives a first response packet sent by the target device, where the first response packet is a response packet sent by the target device according to the third target packet.

1107. The second device translates destination address information and destination port information of the first response packet into the address information and port information of the first device to obtain a second response packet.

1108. The second device sends the second response packet to the first device through the transparent transmission channel.

1109. The first device translates destination address information and destination port information of the second response packet into the source address information and source port information of the first target packet to obtain a third response packet.

1110. The first device sends the third response packet to a source device identified by the source address information of the first target packet.

In the foregoing technical solution, a first device establishes a transparent transmission channel with a second device, where the transparent transmission channel spans multiple links connected to the first device and the second device; the first device translates source address information and source port information of a first target packet into address information and port information of the first device to obtain a second target packet; the first device transmits the second target packet to the second device through the transparent transmission channel; the second device translates source address information and source port information of the second target packet into address information and port information of the second device to obtain a third target packet; the second device sends the third target packet to a target device identified by destination address information of the first target packet; the second device receives a first response packet sent by the target device, and the second device translates destination address information and destination port information of the first response packet into the address information and port information of the first device to obtain a second response packet, where the first response packet is a response packet sent by the target device according to the third target packet; the first device receives, through the transparent transmission channel, the second response packet sent by the second device, and translates destination address information and destination port information of the second response packet into the source address information and source port information of the first target packet to obtain a third response packet; and the first device sends the third response packet to a source device identified by the source address information of the first target packet. In this way, NAT is performed when a packet is transmitted between the first device and the second device. Therefore, network address resources are saved, a fast forwarding capability of a router on a transmission path may be used, and thereby packet transmission efficiency may be improved.

The following describes apparatus embodiments of the present invention. The apparatus embodiments of the present invention are used to execute the methods in the above embodiments of the present invention. For ease of description, only parts related to the embodiments of the present invention are described. For specific technical details that are not disclosed, reference may be made to the above embodiments of the present invention.

Figure 12:
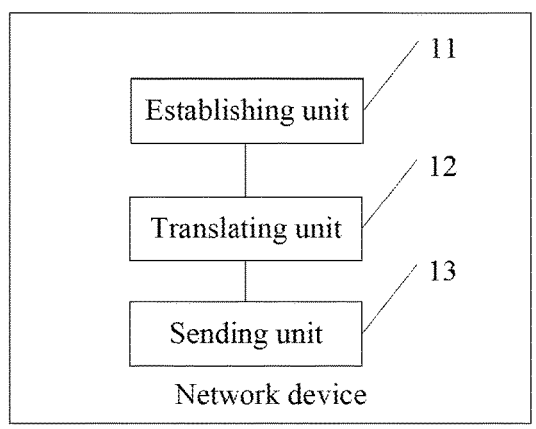
FIG. 12 is a schematic structural diagram of a network device according to an embodiment of the present invention.

FIG. 12 is a schematic structural diagram of a network device according to an embodiment of the present invention. As shown in FIG. 12, the network device includes an establishing unit 11, a translating unit 12, and a sending unit 13.

The establishing unit 11 is configured to establish a transparent transmission channel with a second device, where the transparent transmission channel spans multiple links connected to the network device and the second device.

The translating unit 12 is configured to perform NAT on a first target packet to obtain a second target packet.

The sending unit 13 is configured to transmit the second target packet to the second device through the transparent transmission channel, so that the second device performs NAT on the second target packet to obtain a third target packet, and that the second device sends the third target packet to a target device identified by destination address information of the first target packet.

Optionally, when receiving the second target packet, the second device may perform NAT on the packet, and send a packet obtained through translation to the target device.

Optionally, the network device may include but is not limited to any one of the following devices: an access device, a gateway device (for example, a DSL gateway), a server, and a user equipment (for example, a mobile phone).

Optionally, the second device may include but is not limited to any one of the following devices: an access device, a gateway device (for example, a DSL gateway), a server, and a user equipment (for example, a mobile phone).

However, the network device and the second device are two different devices. For example, when the network device is an access device, the second device may be a server; when the network device is a server, the second device may be an access device, a gateway device, or a user equipment; when the network device is a user-side device, the second device may be an access device, a gateway device, or a server.

Optionally, the links between the network device and the second device include but are not limited to any one of the following links: a DSL link, an LTE link, an FTTX link, an E1 link, a global system for mobile communications (GSM) link, a cable link, a fiber optic link, and so on.

Optionally, the transparent transmission channel includes but is not limited to any one of the following channels: a VPN tunnel, a generic routing encapsulation (GRE) tunnel, a point-to-point transmission channel, and so on.

Optionally, the first target packet may be one or more packets.

In the foregoing technical solution, a network device establishes a transparent transmission channel with a second device, where the transparent transmission channel spans multiple links connected to the network device and the second device; the network device performs NAT on a first target packet to obtain a second target packet; the network device transmits the second target packet to the second device through the transparent transmission channel, so that the second device performs NAT on the second target packet to obtain a third target packet, and the second device sends the third target packet to a target device identified by destination address information of the first target packet. In this way, NAT is performed when a packet is transmitted between the network device and the second device. Therefore, network address resources are saved, a fast forwarding capability of a router on a transmission path may be used, and thereby packet transmission efficiency may be improved.

Figure 13:
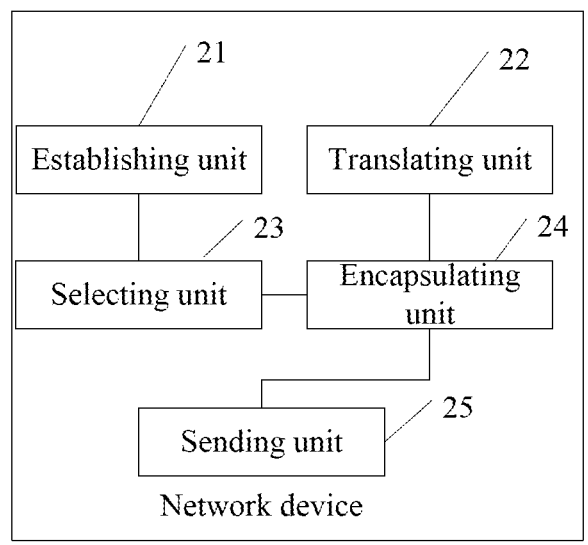
FIG. 13 is a schematic structural diagram of another network device according to an embodiment of the present invention.

FIG. 13 is a schematic structural diagram of a network device according to an embodiment of the present invention. As shown in FIG. 13, the network device includes an establishing unit 21, a translating unit 22, a selecting unit 23, an encapsulating unit 24, and a sending unit 25.

The establishing unit 21 is configured to establish a transparent transmission channel with a second device, where the transparent transmission channel spans multiple links connected to the network device and the second device.

The translating unit 22 is configured to perform NAT on a first target packet to obtain a second target packet.

The selecting unit 23 is configured to execute a link bonding policy, and select a target link from the links that are connected to the network device and the second device and spanned by the transparent transmission channel.

The encapsulating unit 24 is configured to encapsulate the second target packet with the target link to obtain a fourth target packet.

The sending unit 25 is configured to transmit the fourth target packet to the second device through the target link, obtain so that the second device decapsulates the fourth target packet to obtain a third target packet, and the second device sends the third target packet to a target device identified by destination address information of the first target packet.

Optionally, that the first translating unit 22 performs NAT on a first target packet may be that the network device translates source address information and source port information of the first target packet into address information and port information of the network device.

Optionally, that the second device restores and obtains a third target packet may be that the fourth target packet is decapsulated to obtain the second target packet; and that the second device translates source address information and source port information of the second target packet into address information and port information of the second device, the second device translates source address information and source port information of the second target packet into address information and port information of the second device may be that the source address information and source port information of the second target packet are translated into public IP address information and public network port information of the second device respectively.

In an optional implementation manner, the selecting unit 23 may include: a first analyzing unit (not shown in the figure), configured to analyze a bandwidth parameter of each link that is connected to the network device and the second device and spanned by the transparent transmission channel; and a second analyzing unit (not shown in the figure), configured to analyze, according to the bandwidth parameter of each link, a speed and a packet length for sending to a buffer of the link, and select the target link from the multiple links connected to the network device and the second device.

The sending unit 25 may be further configured to send the fourth target packet to the buffer of the target link according to the speed and packet length for sending to the buffer of the target link, and send the fourth target packet in the buffer to the second device through the target link.

Optionally, the bandwidth parameter includes at least one of the following: a packet transmission rate, a packet transmission delay, a packet transmission jitter, and a buffer queue length.

In an optional implementation manner, the first analyzing unit (not shown in the figure) may be further configured to receive a bandwidth parameter, which is sent by a third device, of a second network link between the network device and the second device, where the third device is a device of a second network, and the network device is a device of a first network, and analyze a bandwidth parameter of a first network link between the network device and the second device.

In the foregoing technical solution, on a basis of the foregoing embodiment, multiple implementation manners of packet transmission are mainly described. In all the implementation manners, the number of encapsulation layers is small, implementation is based on standard, and a packet transmission rate may be improved.

Figure 14:
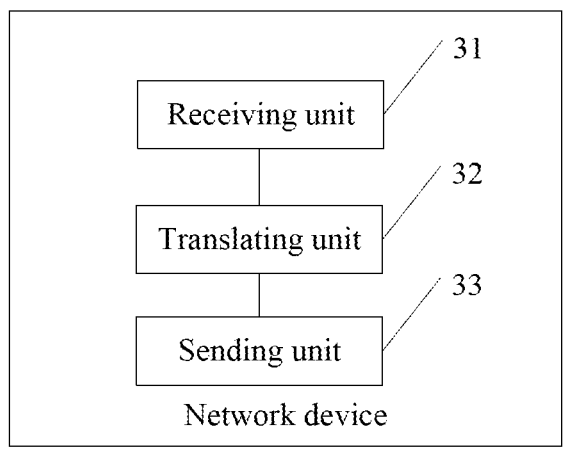
FIG. 14 is a schematic structural diagram of another network device according to an embodiment of the present invention.

FIG. 14 is a schematic structural diagram of a network device according to an embodiment of the present invention. As shown in FIG. 14, the network device includes a receiving unit 31, a translating unit 32, and a sending unit 33.

The receiving unit 31 is configured to receive, through a transparent transmission channel established in advance, a second response packet sent by a second device, where the transparent transmission channel spans multiple links connected to the network device and the second device, and the second response packet is a response packet obtained by the second device by performing NAT on a first response packet, where the first response packet is a response packet that is received by the second device from a target device and sent by the target device in response to a target packet that is sent in advance by the network device to the target device.

The translating unit 32 is configured to perform NAT on the second response packet to obtain a third response packet.

The sending unit 33 is configured to send the third response packet to a device identified by source address information of the target packet.

Optionally, the transparent transmission channel may refer to the transparent transmission channel described in the foregoing embodiment.

Optionally, the network device may include but is not limited to any one of the following devices: an access device, a gateway device (for example, a DSL gateway), a server, and a user equipment (for example, a mobile phone).

Optionally, the second device may include but is not limited to any one of the following devices: an access device, a gateway device (for example, a DSL gateway), a server, and a user equipment (for example, a mobile phone).

However, the network device and the second device are two different devices. For example, when the network device is an access device, the second device may be a server; when the network device is a server, the second device may be an access device, a gateway device, or a user equipment; when the network device is a user-side device, the second device may be an access device, a gateway device, or a server.

Optionally, the links between the network device and the second device include but are not limited to any one of the following links: a DSL link, an LTE link, an FTTX link, an E1 link, a GSM link, a cable link, a fiber optic link, and so on.

Optionally, the transparent transmission channel includes but is not limited to any one of the following channels: a VPN tunnel, a GRE tunnel, a point-to-point transmission channel, and so on.

Optionally, the first target packet may be one or more packets.

Optionally, that the second device performs NAT on a first response packet may be that destination address information and destination port information of the first response packet are translated into address information and port information of the network device.

Optionally, that the network device performs NAT on the second response packet may be that destination address information and destination port information of the second response packet are translated into source address information and source port information of the target packet.

In the foregoing technical solution, a network device receives, through a transparent transmission channel established in advance, a second response packet sent by a second device, where the transparent transmission channel spans multiple links connected to the network device and the second device, and the second response packet is a response packet obtained by the second device by performing NAT on a first response packet, where the first response packet is a response packet that is received by the second device from a target device and sent by the target device in response to a target packet that is sent in advance by the network device to the target device; the network device performs NAT on the second response packet to obtain a third response packet; and the network device sends the third response packet to a device identified by source address information of the target packet. In this way, NAT is performed when a packet is transmitted between the network device and the second device. Therefore, network address resources are saved, a fast forwarding capability of a router on a transmission path may be used, and thereby packet transmission efficiency may be improved.

Figure 15:
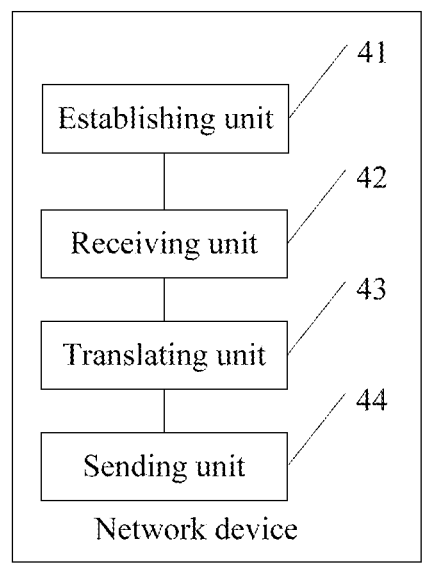
FIG. 15 is a schematic structural diagram of another network device according to an embodiment of the present invention.

FIG. 15 is a schematic structural diagram of a network device according to an embodiment of the present invention. As shown in FIG. 15, the network device includes an establishing unit 41, a receiving unit 42, a translating unit 43, and a sending unit 44.

The establishing unit 41 is configured to establish a transparent transmission channel with a first device, where the transparent transmission channel spans multiple links connected to the network device and the first device.

The receiving unit 42 is configured to receive, through the transparent transmission channel, a second target packet sent by the first device, where the second target packet is a packet obtained by the first device by performing NAT on a first target packet.

The translating unit 43 is configured to perform NAT on the second target packet to obtain a third target packet.

The sending unit 44 is configured to send the third target packet to a target device identified by destination address information of the first target packet.

Optionally, that the first device performs NAT on a first target packet may be that source address information and source port information of the first target packet are translated into address information and port information of the first device.

Optionally, that the network device performs NAT on the second target packet may be that source address information and source port information of the second response packet are translated into address information and port information of the network device.

In the foregoing technical solution, a network device establishes a transparent transmission channel with a first device, where the transparent transmission channel spans multiple links connected to the network device and the first device; the network device receives, through the transparent transmission channel, a second target packet sent by the first device, where the second target packet is a packet obtained by the first device by performing NAT on a first target packet; the network device performs NAT on the second target packet to obtain a third target packet; and the network device sends the third target packet to a target device identified by destination address information of the first target packet. In this way, NAT is performed when a packet is transmitted between the first device and the network device. Therefore, network address resources are saved, a fast forwarding capability of a router on a transmission path may be used, and thereby packet transmission efficiency may be improved.

Figure 16:
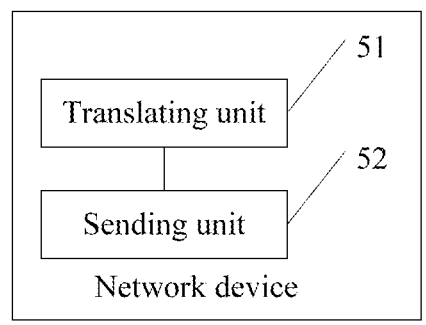
FIG. 16 is a schematic structural diagram of another network device according to an embodiment of the present invention.

FIG. 16 is a schematic structural diagram of a network device according to an embodiment of the present invention. As shown in FIG. 16, the network device includes a translating unit 51 and a sending unit 52.

The translating unit 51 is configured to perform NAT on a first response packet to obtain a second response packet, where the first response packet is a response packet that is received by the network device from a target device and sent by the target device in response to a target packet that is sent in advance by a first device to the target device.

The sending unit 52 is configured to transmit the second response packet to the first device through a transparent transmission channel established in advance, so that the first device performs NAT on the second response packet to obtain a third response packet, and the first device sends the third response packet to a device identified by source address information of the target packet, where the transparent transmission channel spans multiple links connected to the first device and the network device.

Optionally, the transparent transmission channel may refer to the transparent transmission channel described in the foregoing embodiment.

Optionally, the first device may include but is not limited to any one of the following devices: an access device, a gateway device (for example, a DSL gateway), a server, and a user equipment (for example, a mobile phone).

Optionally, the network device may include but is not limited to any one of the following devices: an access device, a gateway device (for example, a DSL gateway), a server, and a user equipment (for example, a mobile phone).

However, the first device and the network device are two different devices. For example, when the first device is an access device, the network device may be a server; when the first device is a server, the network device may be an access device, a gateway device, or a user equipment; when the first device is a user-side device, the network device may be an access device, a gateway device, or a server.

Optionally, the links between the first device and the network device include but are not limited to any one of the following links: a DSL link, an LTE link, an FTTX link, an E1 link, a GSM link, a cable link, a fiber optic link, and so on.

Optionally, the transparent transmission channel includes but is not limited to any one of the following channels: a VPN tunnel, a GRE tunnel, a point-to-point transmission channel, and so on.

Optionally, the first target packet may be one or more packets.

In the foregoing technical solution, a network device performs NAT on a first response packet to obtain a second response packet, where the first response packet is a response packet that is received by the network device from a target device and sent by the target device in response to a target packet that is sent in advance by a first device to the target device; and the network device transmits the second response packet to the first device through a transparent transmission channel established in advance, so that the first device performs NAT on the second response packet to obtain a third response packet, and the first device sends the third response packet to a device identified by source address information of the target packet, where the transparent transmission channel spans multiple links connected to the first device and the network device. In this way, NAT is performed when a packet is transmitted between the first device and the network device. Therefore, network address resources are saved, a fast forwarding capability of a router on a transmission path may be used, and thereby packet transmission efficiency may be improved.

Figure 17:
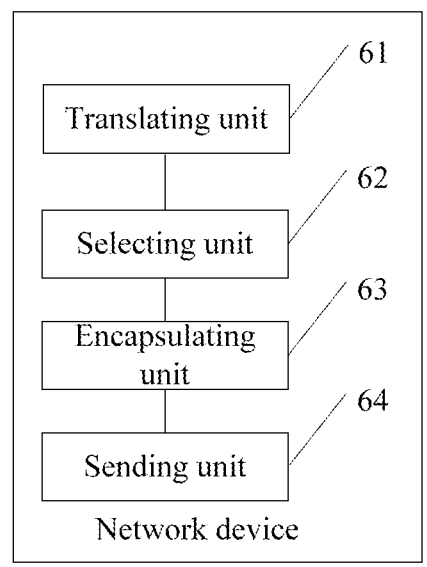
FIG. 17 is a schematic structural diagram of another network device according to an embodiment of the present invention.

FIG. 17 is a schematic structural diagram of a network device according to an embodiment of the present invention. As shown in FIG. 17, the network device includes a translating unit 61, a selecting unit 62, an encapsulating unit 63, and a sending unit 63.

The translating unit 61 is configured to perform NAT on a first response packet to obtain a second response packet, where the first response packet is a response packet that is received by the network device from a target device and sent by the target device in response to a target packet that is sent in advance by a first device to the target device.

The selecting unit 62 is configured to execute a link bonding policy, and select a target link from links that are connected to the network device and the first device and spanned by a transparent transmission channel established in advance.

The encapsulating unit 63 is configured to encapsulate the second response packet with the target link to obtain a fourth response packet.

The sending unit 64 is configured to send, through the target link, the fourth response packet to an interface, on which the target link is established, of the first device, obtain so that the first device decapsulates the fourth response packet to obtain a third response packet, and the first device sends the third response packet to a device identified by source address information of the target packet.

Optionally, that the translating unit 61 performs NAT on a first response packet may be that destination address information and destination port information of the first response packet are translated into address information and port information of the first device.

Optionally, that the first device performs NAT on the second response packet may be that destination address information and destination port information of the second response packet are translated into source address information and source port information of the target packet.

In an implementation manner, the selecting unit 62 may include: a receiving subunit (not shown in the figure), configured to receive a bandwidth parameter, which is sent by the first device, of each link that is connected to the network device and the first device and spanned by the transparent transmission channel established in advance, where the bandwidth parameter of each link is a bandwidth parameter of each link obtained by the first device by analysis; and an analyzing unit (not shown in the figure), configured to analyze, according to the bandwidth parameter of each link, a speed and a packet length for sending to a buffer of the link, and select the target link from the multiple links that are connected to the network device and the first device and spanned by the transparent transmission channel established in advance.

The sending unit 64 may be further configured to send the fourth response packet to the buffer of the target link according to the speed and packet length for sending to the buffer of the target link, and send the fourth response packet in the buffer to the interface of the first device on which the target link is established.

In the foregoing technical solution, on a basis of the foregoing embodiment, multiple implementation manners of packet transmission are mainly described. In all the implementation manners, standard-based NAT translation and encapsulation are performed, and a packet forwarding rate may be improved.

Figure 18:
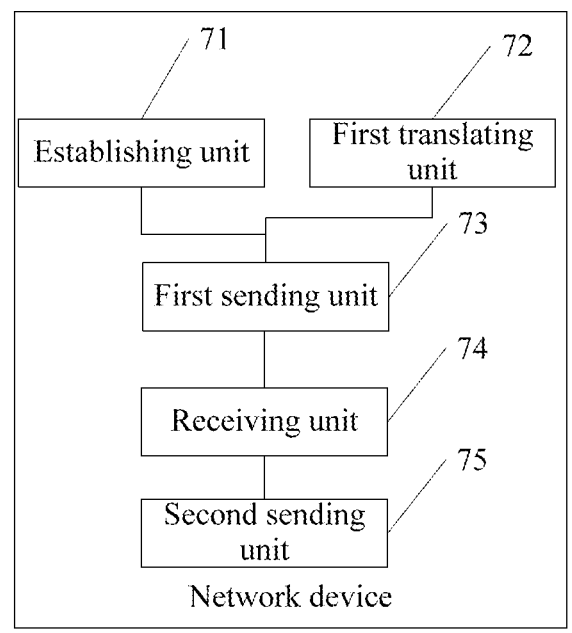
FIG. 18 is a schematic structural diagram of a multi-link aggregation system according to an embodiment of the present invention.

FIG. 18 is a schematic structural diagram of a network device according to an embodiment of the present invention. As shown in FIG. 18, the network device includes an establishing unit 71, a first translating unit 72, a first sending unit 73, a receiving unit 74, and a second sending unit 75.

The establishing unit 71 is configured to establish a transparent transmission channel with a second device, where the transparent transmission channel spans multiple links connected to the network device and the second device.

The first translating unit 72 is configured to translate source address information and source port information of a first target packet into address information and port information of the network device to obtain a second target packet.

The first sending unit 73 is configured to transmit the second target packet to the second device through the transparent transmission channel, so that the second device translates source address information and source port information of the second target packet into address information and port information of the second device to obtain a third target packet, the second device sends the third target packet to a target device identified by destination address information of the first target packet, the second device receives a first response packet sent by the target device, and the second device translates destination address information and destination port information of the first response packet into the address information and port information of the network device to obtain a second response packet, where the first response packet is a response packet sent by the target device according to the third target packet.

The receiving unit 74 is configured to receive, through the transparent transmission channel, the second response packet sent by the second device, and translate destination address information and destination port information of the second response packet into the source address information and source port information of the first target packet to obtain a third response packet.

The second sending unit 75 is configured to send the third response packet to a device identified by the source address information of the first target packet.

Optionally, the network device may include but is not limited to any one of the following devices: an access device, a gateway device, a server, and a user equipment.

Optionally, the second device may include but is not limited to any one of the following devices: an access device, a gateway device, a server, and a user-side device.

However, the network device and the second device are two different devices. For example, when the network device is an access device, the second device may be a server; when the network device is a server, the second device may be an access device, a gateway device, or a user equipment; when the network device is a user-side device, the second device may be an access device, a gateway device, or a server.

Optionally, the links between the network device and the second device include but are not limited to any one of the following links: a DSL link, an LTE link, an FTTX link, an E1 link, a GSM link, a cable link, a fiber optic link, and so on.

Optionally, the transparent transmission channel includes but is not limited to any one of the following channels: a VPN tunnel, a GRE tunnel, a point-to-point transmission channel, and so on.

Optionally, the first target packet may be one or more packets.

In the foregoing technical solution, a network device establishes a transparent transmission channel with a second device, where the transparent transmission channel spans multiple links connected to the network device and the second device; the network device translates source address information and source port information of a first target packet into address information and port information of the network device to obtain a second target packet; the network device transmits the second target packet to the second device through the transparent transmission channel, so that the second device translates source address information and source port information of the second target packet into address information and port information of the second device to obtain a third target packet, the second device sends the third target packet to a target device identified by destination address information of the first target packet, the second device receives a first response packet sent by the target device, and the second device translates destination address information and destination port information of the first response packet into the address information and port information of the network device to obtain a second response packet, where the first response packet is a response packet sent by the target device according to the third target packet; the network device receives, through the transparent transmission channel, the second response packet sent by the second device, and translates destination address information and destination port information of the second response packet into the source address information and source port information of the first target packet to obtain a third response packet; and the network device sends the third response packet to a device identified by the source address information of the first target packet. In this way, NAT is performed when a packet is transmitted between the network device and the second device. Therefore, network address resources are saved, a fast forwarding capability of a router on a transmission path may be used, and thereby packet transmission efficiency may be improved.

Figure 19:
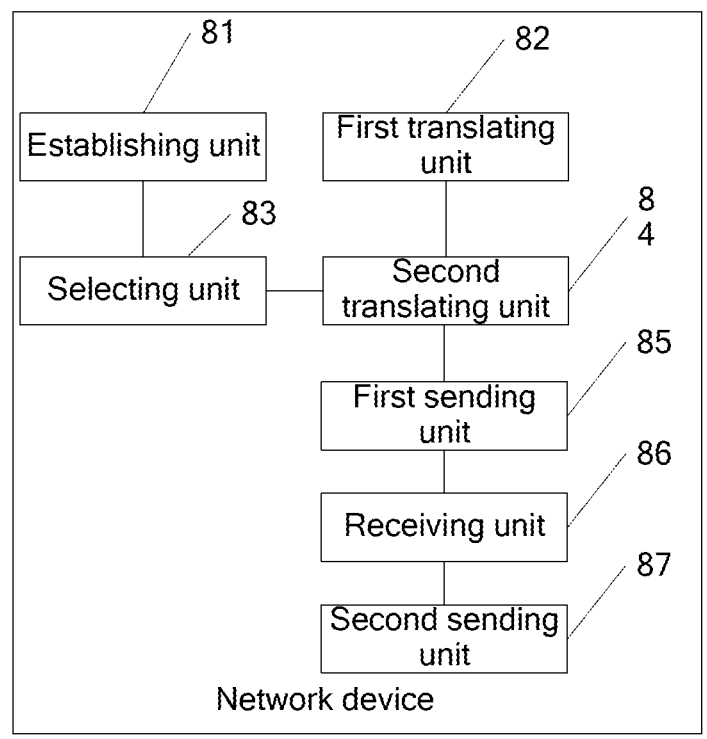
FIG. 19 is a schematic structural diagram of another network device according to an embodiment of the present invention.

FIG. 19 is a schematic structural diagram of another network device according to an embodiment of the present invention. As shown in FIG. 19, the network device includes an establishing unit 81, a first translating unit 82, a selecting unit 83, a second translating unit 84, a first sending unit 85, a receiving unit 86, and a second sending unit 87.

The establishing unit 81 is configured to establish a transparent transmission channel with a second device, where the transparent transmission channel spans multiple links connected to the network device and the second device.

The first translating unit 82 is configured to translate source address information and source port information of a first target packet into address information and port information of the network device to obtain a second target packet.

Optionally, the first target packet may be an uplink packet. Optionally, the first target packet may be one or more packets sent by a user-side device (for example, a home terminal or a mobile terminal), and the network device is an access device or a gateway device.

Optionally, the first target packet may be a downlink packet. Optionally, the first target packet may be one or more packets sent by an Internet device, and the network device is an aggregation server.

The selecting unit 83 is configured to execute a link bonding policy, and select a target link from the links that are connected to the network device and the second device and spanned by the transparent transmission channel.

The second translating unit 84 is configured to encapsulate the second target packet with the selected target link to obtain a fourth target packet.

The first sending unit 85 is configured to transmit the fourth target packet to the second device through the target link, obtain so that the second device decapsulates the fourth target packet to obtain a third target packet, the second device sends the third target packet to a target device identified by destination address information of the first target packet, the second device receives a first response packet sent by the target device, and the second device translates destination address information and destination port information of the first response packet into the address information and port information of the network device to obtain a second response packet, where the first response packet is a response packet sent by the target device according to the third target packet.

The receiving unit 86 is configured to receive, through the target link, the second response packet sent by the second device, and translate destination address information and destination port information of the second response packet into the source address information and source port information of the first target packet to obtain a third response packet.

The second sending unit 87 is configured to send the third response packet to a device identified by the source address information of the first target packet.

In the foregoing technical solution, on a basis of the foregoing embodiment, multiple implementation manners of packet transmission are mainly described; the number of encapsulation layers is small, and a packet transmission rate may be improved.

Figure 20:
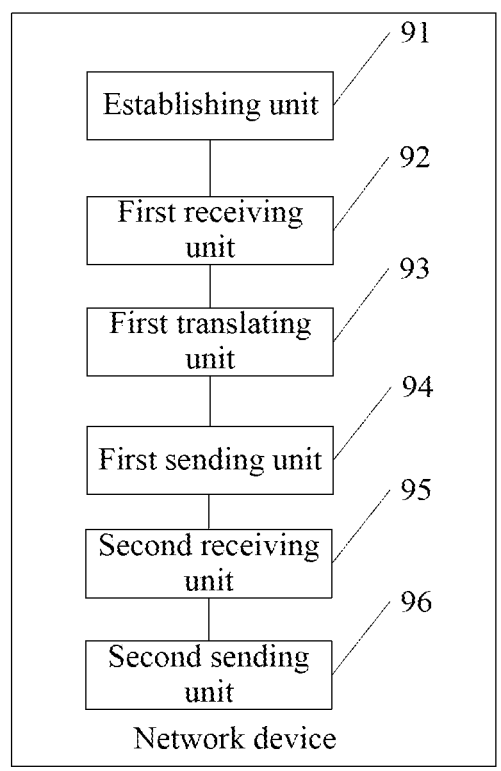
FIG. 20 is a schematic structural diagram of another network device according to an embodiment of the present invention.

FIG. 20 is a schematic structural diagram of another network device according to an embodiment of the present invention. As shown in FIG. 20, the network device includes an establishing unit 91, a first receiving unit 92, a first translating unit 93, a first sending unit 94, a second receiving unit 95, and a second sending unit 96.

The establishing unit 91 is configured to establish a transparent transmission channel with a first device, where the transparent transmission channel spans multiple links connected to the network device and the first device.

The first receiving unit 92 is configured to receive, through the transparent transmission channel, a second target packet sent by the first device, where the second target packet is a packet obtained by the first device by translating source address information and source port information of a first target packet into address information and port information of the first device.

The first translating unit 93 is configured to translate source address information and source port information of the second target packet into address information and port information of the network device to obtain a third target packet.

The first sending unit 94 is configured to send the third target packet to a target device identified by destination address information of the first target packet.

The second receiving unit 95 is configured to receive a first response packet sent by the target device, and translate destination address information and destination port information of the first response packet into the address information and port information of the first device to obtain a second response packet, where the first response packet is a response packet sent by the target device according to the third target packet.

The second sending unit 96 is configured to send the second response packet to the first device through the transparent transmission channel, so that the first device translates destination address information and destination port information of the second response packet into the source address information and source port information of the first target packet to obtain a third response packet, and the first device sends the third response packet to a device identified by the source address information of the first target packet.

Optionally, the address information and port information may be translated by NAT.

Optionally, when receiving the second target packet, the network device may perform NAT on the packet, and send a packet obtained through translation to the target device.

Optionally, the first device may include but is not limited to any one of the following devices: an access device, a gateway device, a server, and a user equipment.

Optionally, the network device may include but is not limited to any one of the following devices: an access device, a gateway device, a server, and a user-side device.

However, the first device and the network device are two different devices. For example, when the first device is an access device, the network device may be a server; when the first device is a server, the network device may be an access device, a gateway device, or a user equipment; when the first device is a user-side device, the network device may be an access device, a gateway device, or a server.

Optionally, the links between the first device and the network device include but are not limited to any one of the following links: a DSL link, an LTE link, an FTTX link, an E1 link, a GSM link, a cable link, a fiber optic link, and so on.

Optionally, the transparent transmission channel includes but is not limited to any one of the following channels: a VPN tunnel, a GRE tunnel, and so on.

Optionally, the first target packet may be one or more packets.

In the foregoing technical solution, a network device establishes a transparent transmission channel with a first device, where the transparent transmission channel spans multiple links connected to the network device and the first device; the network device receives, through the transparent transmission channel, a second target packet sent by the first device, where the second target packet is a packet obtained by the first device by translating source address information and source port information of a first target packet into address information and port information of the first device; the network device translates source address information and source port information of the second target packet into address information and port information of the network device to obtain a third target packet; the network device sends the third target packet to a target device identified by destination address information of the first target packet; the network device receives a first response packet sent by the target device, and translates destination address information and destination port information of the first response packet into the address information and port information of the first device to obtain a second response packet, where the first response packet is a response packet sent by the target device according to the third target packet; and the network device sends the second response packet to the first device through the transparent transmission channel, so that the first device translates destination address information and destination port information of the second response packet into the source address information and source port information of the first target packet to obtain a third response packet, and the first device sends the third response packet to a device identified by the source address information of the first target packet. In this way, NAT is performed when a packet is transmitted between the first device and the network device, and thereby packet transmission efficiency may be improved.

Figure 21:
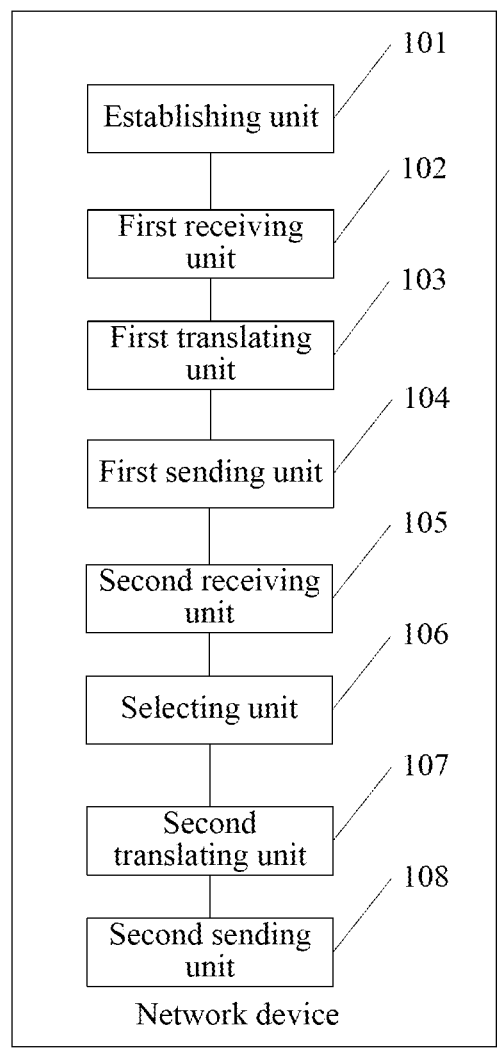
FIG. 21 is a schematic structural diagram of another network device according to an embodiment of the present invention.

FIG. 21 is a schematic structural diagram of another network device according to an embodiment of the present invention. As shown in FIG. 21, the network device includes an establishing unit 101, a first receiving unit 102, a first translating unit 103, a first sending unit 104, a second receiving unit 105, a selecting unit 106, a second translating unit 107, and a second sending unit 108.

The establishing unit 101 is configured to establish a transparent transmission channel with a first device, where the transparent transmission channel spans multiple links connected to the network device and the first device.

The first receiving unit 102 is configured to receive, through the transparent transmission channel, a second target packet sent by the first device, where the second target packet is a packet obtained by the first device by translating source address information and source port information of a first target packet into address information and port information of the first device.

The first translating unit 103 is configured to translate source address information and source port information of the second target packet into address information and port information of the network device to obtain a third target packet.

The first sending unit 104 is configured to send the third target packet to a target device identified by destination address information of the first target packet.

The second receiving unit 105 is configured to receive a first response packet sent by the target device, and translate destination address information and destination port information of the first response packet into the address information and port information of the first device to obtain a second response packet, where the first response packet is a response packet sent by the target device according to the third target packet.

The selecting unit 106 is configured to execute a link bonding policy, and select a target link from the links that are connected to the network device and the first device and spanned by the transparent transmission channel.

The second translating unit 107 is configured to encapsulate the second response packet with the transparent transmission channel to obtain a fourth response packet.

The second sending unit 108 is configured to send, through the target link, the fourth response packet to an interface, on which the target link is established, of the first device, obtain so that the first device decapsulates the fourth response packet to obtain a third response packet, and the first device sends the third response packet to a device identified by the source address information of the first target packet.

In the foregoing technical solution, on a basis of the foregoing embodiment, multiple implementation manners of packet transmission are mainly described; the number of encapsulation layers is small, and a packet transmission rate may be improved.

Figure 22:
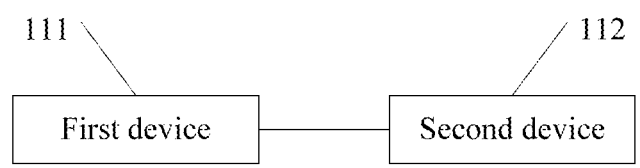
FIG. 22 is a schematic structural diagram of a multi-link aggregation system according to an embodiment of the present invention.

FIG. 22 is a schematic structural diagram of a multi-link aggregation system according to an embodiment of the present invention. As shown in FIG. 22, the system includes a first device 111 and a second device 112.

The first device 111 may be the network device in any one implementation manner of the embodiments shown in FIG. 12, FIG. 13, FIG. 14, FIG. 18, and FIG. 19.

The second device 112 may be the network device in any one implementation manner of the embodiments shown in FIG. 15, FIG. 16, FIG. 17, FIG. 20, and FIG. 21.

In the foregoing technical solution, a first device establishes a transparent transmission channel with a second device, where the transparent transmission channel spans multiple links connected to the first device and the second device; the first device performs NAT on a first target packet to obtain a second target packet; and the first device transmits the second target packet to the second device through the transparent transmission channel, so that the second device performs NAT on the second target packet to obtain a third target packet, and the second device sends the third target packet to a target device identified by destination address information of the first target packet. In this way, NAT is performed when a packet is transmitted between the first device and the second device. Therefore, network address resources are saved, a fast forwarding capability of a router on a transmission path may be used, and thereby packet transmission efficiency may be improved.

Figure 23:
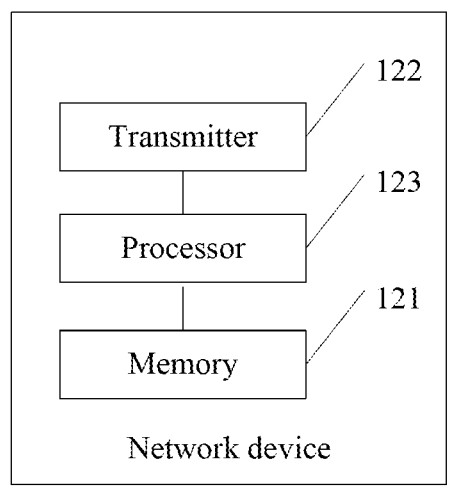
FIG. 23 is a schematic structural diagram of another network device according to an embodiment of the present invention.

FIG. 23 is a schematic structural diagram of another network device according to an embodiment of the present invention. As shown in FIG. 23, the network device includes a memory 121, a transmitter 122, and a processor 123 that is connected to the memory 121 and transmitter 122. The memory 121 is configured to store a group of program code. The processor 123 is configured to invoke a program stored in the memory 121 to execute the following operations: establishing a transparent transmission channel with a second device, where the transparent transmission channel spans multiple links connected to the network device and the second device; performing NAT on a first target packet to obtain a second target packet; and controlling the transmitter 122 to transmit the second target packet to the second device through the transparent transmission channel, so that the second device performs NAT on the second target packet to obtain a third target packet, and the second device sends the third target packet to a target device identified by destination address information of the first target packet.

In another optional embodiment, the processor 123 may be further configured to execute the following operations: establishing a transparent transmission channel with a second device, where the transparent transmission channel spans multiple links connected to the network device and the second device; performing NAT on a first target packet to obtain a second target packet; executing a link bonding policy (for example, a Link Channel Policy), and selecting a target link from the links that are connected to the network device and the second device and spanned by the transparent transmission channel; encapsulating the second target packet with the selected target link to obtain a fourth target packet; and controlling the transmitter 122 to transmit the fourth target packet to the second device through the target link, obtain so that the second device decapsulates the fourth target packet to obtain a third target packet, and the second device sends the third target packet to a target device identified by destination address information of the first target packet.

In an optional implementation manner, the operation of executing a link bonding policy (for example, a Link Channel Policy), and selecting a target link from the links that are connected to the network device and the second device and spanned by the transparent transmission channel, which is executed by the processor 123, may include: analyzing a bandwidth parameter of each link that is connected to the network device and the second device and spanned by the transparent transmission channel; and analyzing, according to the bandwidth parameter of each link, a speed and a packet length for sending to a buffer of the link, and selecting the target link from the multiple links connected to the network device and the second device.

Optionally, the bandwidth parameter includes at least one of the following: a packet transmission rate, a packet transmission delay, a packet transmission jitter, and a buffer queue length.

In the foregoing technical solution, a network device establishes a transparent transmission channel with a second device, where the transparent transmission channel spans multiple links connected to the network device and the second device; the network device performs NAT on a first target packet to obtain a second target packet; the network device transmits the second target packet to the second device through the transparent transmission channel, so that the second device performs NAT on the second target packet to obtain a third target packet, and the second device sends the third target packet to a target device identified by destination address information of the first target packet. In this way, NAT is performed when a packet is transmitted between the network device and the second device. Therefore, network address resources are saved, a fast forwarding capability of a router on a transmission path may be used, and thereby packet transmission efficiency may be improved.

Figure 24:
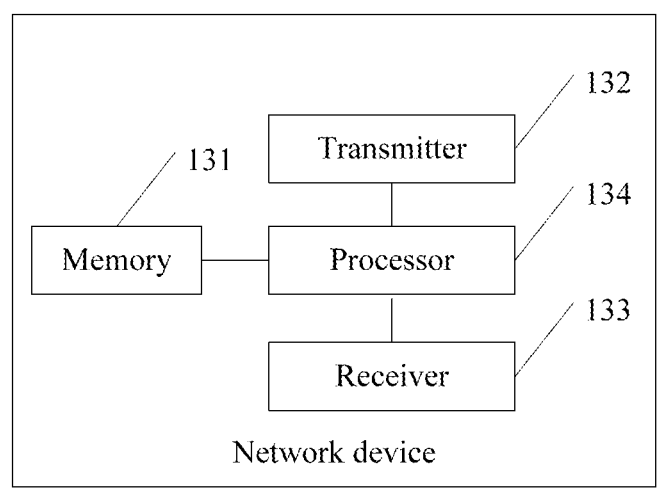
FIG. 24 is a schematic structural diagram of another network device according to an embodiment of the present invention.

FIG. 24 is a schematic structural diagram of another network device according to an embodiment of the present invention. As shown in FIG. 24, the network device includes a memory 131, a transmitter 132, a receiver 133, and a processor 134 that is connected to the memory 131, transmitter 132, and receiver 133. The memory 131 is configured to store a group of program code. The processor 134 is configured to invoke a program stored in the memory 131 to execute the following operations: controlling the receiver 133 to receive, through a transparent transmission channel established in advance, a second response packet sent by a second device, where the transparent transmission channel spans multiple links connected to the network device and the second device, and the second response packet is a response packet obtained by the second device by performing NAT on a first response packet, where the first response packet is a response packet that is received by the second device from a target device and sent by the target device in response to a target packet that is sent in advance by the network device to the target device; performing NAT on the second response packet to obtain a third response packet; and controlling the transmitter 132 to send the third response packet to a device identified by source address information of the target packet.

In the foregoing technical solution, a network device receives, through a transparent transmission channel established in advance, a second response packet sent by a second device, where the transparent transmission channel spans multiple links connected to the network device and the second device, and the second response packet is a response packet obtained by the second device by performing NAT on a first response packet, where the first response packet is a response packet that is received by the second device from a target device and sent by the target device in response to a target packet that is sent in advance by the network device to the target device; the network device performs NAT on the second response packet to obtain a third response packet; and the network device sends the third response packet to a device identified by source address information of the target packet. In this way, NAT is performed when a packet is transmitted between the network device and the second device. Therefore, network address resources are saved, a fast forwarding capability of a router on a transmission path may be used, and thereby packet transmission efficiency may be improved.

Figure 25:
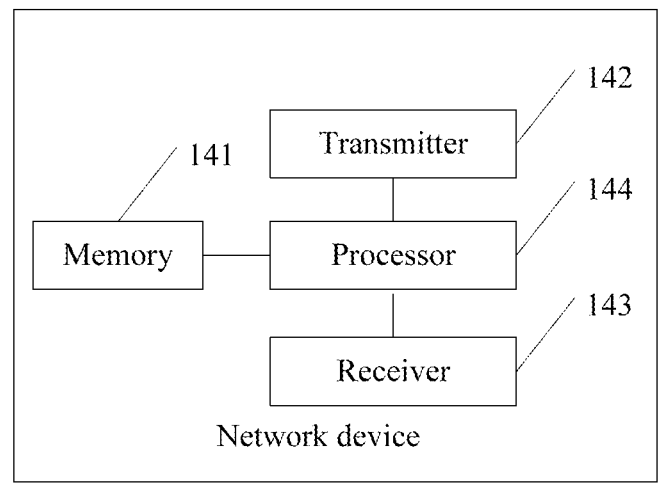
FIG. 25 is a schematic structural diagram of another network device according to an embodiment of the present invention.

FIG. 25 is a schematic structural diagram of another network device according to an embodiment of the present invention. As shown in FIG. 25, the network device includes a memory 141, a transmitter 142, a receiver 143, and a processor 144 that is connected to the memory 141, transmitter 142, and receiver 143. The memory 141 is configured to store a group of program code. The processor 144 is configured to invoke a program stored in the memory 141 to execute the following operations: establishing a transparent transmission channel with a first device, where the transparent transmission channel spans multiple links connected to the network device and the first device; controlling the receiver 143 to receive, through the transparent transmission channel, a second target packet sent by the first device, where the second target packet is a packet obtained by the first device by performing NAT on a first target packet; performing NAT on the second target packet to obtain a third target packet; and controlling the transmitter 142 to send the third target packet to a target device identified by destination address information of the first target packet.

In the foregoing technical solution, a second device establishes a transparent transmission channel with a first device, where the transparent transmission channel spans multiple links connected to the second device and the first device; the second device receives, through the transparent transmission channel, a second target packet sent by the first device, where the second target packet is a packet obtained by the first device by performing NAT on a first target packet; the second device performs NAT on the second target packet to obtain a third target packet; and the second device sends the third target packet to a target device identified by destination address information of the first target packet. In this way, NAT is performed when a packet is transmitted between the first device and the second device.

Therefore, network address resources are saved, a fast forwarding capability of a router on a transmission path may be used, and thereby packet transmission efficiency may be improved.

Figure 26:
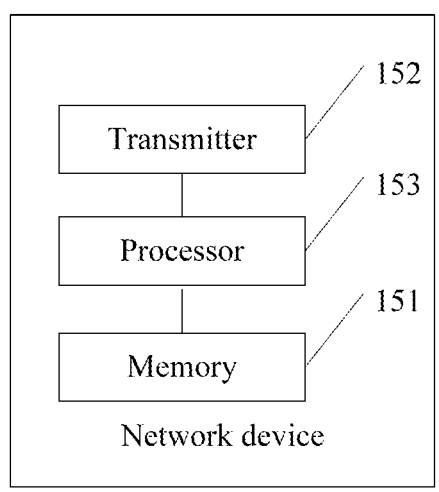
FIG. 26 is a schematic structural diagram of another network device according to an embodiment of the present invention.

FIG. 26 is a schematic structural diagram of another network device according to an embodiment of the present invention. As shown in FIG. 26, the network device includes a memory 151, a transmitter 152, and a processor 153 that is connected to the memory 151 and transmitter 152. The memory 151 is configured to store a group of program code. The processor 153 is configured to invoke a program stored in the memory 151 to execute the following operations: performing NAT on a first response packet to obtain a second response packet, where the first response packet is a response packet received by the network device from a target device, which is sent by the target device in response to a target packet that is sent in advance by a first device to the target device; and controlling the transmitter 152 to transmit the second response packet to the first device through a transparent transmission channel established in advance, so that the first device performs NAT on the second response packet to obtain a third response packet, and the first device sends the third response packet to a device identified by source address information of the target packet, where the transparent transmission channel spans multiple links connected to the first device and the second device.

In another optional embodiment, the processor 153 may be further configured to execute the following operations: performing NAT on a first response packet to obtain a second response packet, where the first response packet is a response packet that is received by the second device from a target device and sent by the target device in response to a target packet that is sent in advance by a first device to the target device; executing a link bonding policy, and selecting a target link from links that are connected to the second device and the first device and spanned by a transparent transmission channel established in advance, where the transparent transmission channel spans multiple links connected to the first device and the second device; encapsulating the second response packet with the target link to obtain a fourth response packet; and controlling the transmitter 152 to send, through the target link, the fourth response packet to an interface, on which the target link is established, of the first device, obtainso that the first device decapsulates the fourth response packet to obtain a third response packet, and the first device sends the third response packet to a device identified by source address information of the target packet.

In another optional implementation manner, the operation of executing a link bonding policy, and selecting a target link from links that are connected to the second device and the first device and spanned by a transparent transmission channel established in advance, which is executed by the processor 153, may include: receiving a bandwidth parameter, which is sent by the first device, of each link that is connected to the second device and the first device and spanned by the transparent transmission channel established in advance, where the bandwidth parameter of each link is a bandwidth parameter of each link obtained by the first device by analysis; and analyzing, according to the bandwidth parameter of each link, a speed and a packet length for sending to a buffer of the link, and selecting the target link from the multiple links that are connected to the second device and the first device and spanned by the transparent transmission channel established in advance.

In the foregoing technical solution, on a basis of the foregoing embodiment, multiple implementation manners of packet transmission are mainly described. In all the implementation manners, standard-based NAT translation and encapsulation are performed, and a packet forwarding rate may be improved.

Figure 27:
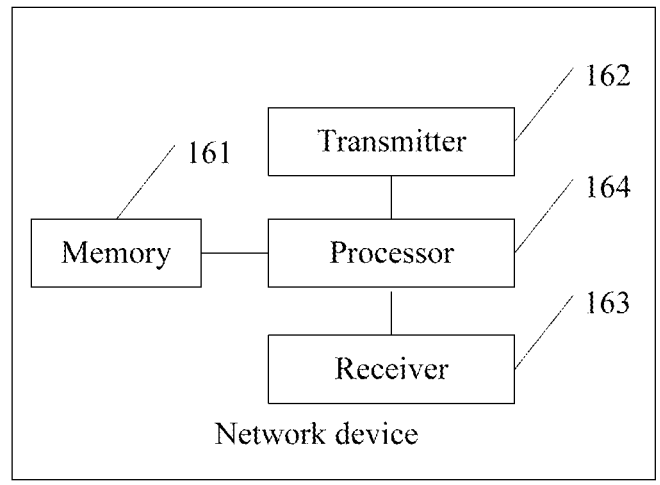
FIG. 27 is a schematic structural diagram of another network device according to an embodiment of the present invention.

FIG. 27 is a schematic structural diagram of another network device according to an embodiment of the present invention. As shown in FIG. 27, the network device includes a memory 161, a transmitter 162, a receiver 163, and a processor 164 that is connected to the memory 161, transmitter 162, and receiver 163. The memory 161 is configured to store a group of program code. The processor 164 is configured to invoke a program stored in the memory 161 to execute the following operations: establishing a transparent transmission channel with a second device, where the transparent transmission channel spans multiple links connected to the network device and the second device; translating source address information and source port information of a first target packet into address information and port information of the network device to obtain a second target packet; controlling the transmitter 162 to transmit the second target packet to the second device through the transparent transmission channel, so that the second device translates source address information and source port information of the second target packet into address information and port information of the second device to obtain a third target packet, the second device sends the third target packet to a target device identified by destination address information of the first target packet, the second device receives a first response packet sent by the target device, and the second device translates destination address information and destination port information of the first response packet into the address information and port information of the network device to obtain a second response packet, where the first response packet is a response packet sent by the target device according to the third target packet; controlling the receiver 163 to receive, through the transparent transmission channel, the second response packet sent by the second device, and translate destination address information and destination port information of the second response packet into the source address information and source port information of the first target packet to obtain a third response packet; and controlling the transmitter 162 to send the third response packet to a device identified by the source address information of the first target packet.

Optionally, the address information and port information may be translated by NAT (Network Address Translation, NAT).

Optionally, when receiving the second target packet, the second device may perform NAT on the packet, and send a packet obtained through translation to the target device.

Optionally, the network device may include but is not limited to any one of the following devices: an access device, a gateway device, a server, and a user equipment.

Optionally, the second device may include but is not limited to any one of the following devices: an access device, a gateway device, a server, and a user-side device.

Optionally, the links between the network device and the second device include but are not limited to any one of the following links: a DSL link, an LTE link, an FTTX link, an E1 link, a global system for mobile communications (GSM) link, a cable link, a fiber optic link, and so on.

Optionally, the transparent transmission channel includes but is not limited to any one of the following channels: a VPN tunnel, a generic routing encapsulation (GRE) tunnel, a point-to-point transmission channel, and so on.

Optionally, the first target packet may be one or more packets.

In another optional embodiment, the processor 164 may be further configured to execute the following operations: establishing a transparent transmission channel with a second device, where the transparent transmission channel spans multiple links connected to the network device and the second device; translating source address information and source port information of a first target packet into address information and port information of the network device to obtain a second target packet; executing a link bonding policy (for example, a Link Channel Policy), and selecting a target link from the links that are connected to the network device and the second device and spanned by the transparent transmission channel.

The processor 164 may be further configured to execute the following operations: encapsulating the second target packet with the selected target link to obtain a fourth target packet; controlling the transmitter 162 to transmit the fourth target packet to the second device through the target link, obtain so that the second device decapsulates the fourth target packet to obtain a third target packet, the second device sends the third target packet to a target device identified by destination address information of the first target packet, the second device receives a first response packet sent by the target device, and the second device translates destination address information and destination port information of the first response packet into the address information and port information of the network device to obtain a second response packet, where the first response packet is a response packet sent by the target device according to the third target packet.

The processor 164 may be further configured to execute the following operations: controlling the receiver 163 to receive, through the target link, the second response packet sent by the second device, and translate destination address information and destination port information of the second response packet into the source address information and source port information of the first target packet to obtain a third response packet; and controlling the transmitter 162 to send the third response packet to a device identified by the source address information of the first target packet.

In the foregoing technical solution, a network device establishes a transparent transmission channel with a second device, where the transparent transmission channel spans multiple links connected to the network device and the second device; the network device translates source address information and source port information of a first target packet into address information and port information of the network device to obtain a second target packet; the network device transmits the second target packet to the second device through the transparent transmission channel, so that the second device translates source address information and source port information of the second target packet into address information and port information of the second device to obtain a third target packet, the second device sends the third target packet to a target device identified by destination address information of the first target packet, the second device receives a first response packet sent by the target device, and the second device translates destination address information and destination port information of the first response packet into the address information and port information of the network device to obtain a second response packet, where the first response packet is a response packet sent by the target device according to the third target packet; the network device receives, through the transparent transmission channel, the second response packet sent by the second device, and translates destination address information and destination port information of the second response packet into the source address information and source port information of the first target packet to obtain a third response packet; and the network device sends the third response packet to a device identified by the source address information of the first target packet. In this way, NAT is performed when a packet is transmitted between the network device and the second device. Therefore, network address resources are saved, a fast forwarding capability of a router on a transmission path may be used, and thereby packet transmission efficiency may be improved.

Figure 28:
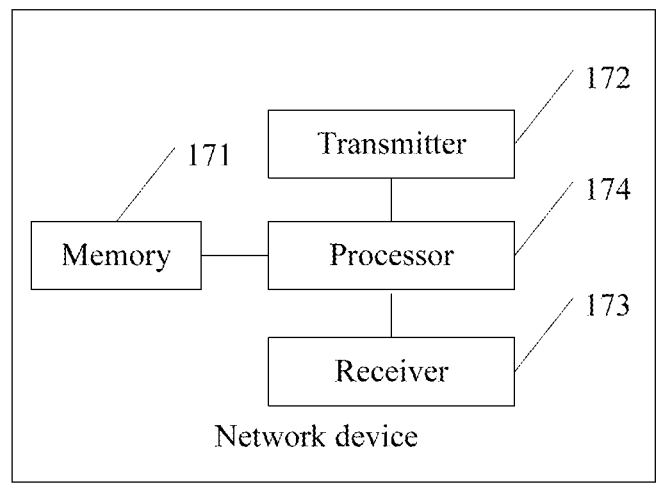
FIG. 28 is a schematic structural diagram of another network device according to an embodiment of the present invention.

FIG. 28 is a schematic structural diagram of another network device according to an embodiment of the present invention. As shown in FIG. 28, the network device includes a memory 171, a transmitter 172, a receiver 173, and a processor 174 that is connected to the memory 171, transmitter 172, and receiver 173. The memory 171 is configured to store a group of program code. The processor 174 is configured to invoke a program stored in the memory 171 to execute the following operations: establishing a transparent transmission channel with a first device, where the transparent transmission channel spans multiple links connected to the network device and the first device; controlling the receiver 173 to receive, through the transparent transmission channel, a second target packet sent by the first device, where the second target packet is a packet obtained by the first device by translating source address information and source port information of a first target packet into address information and port information of the first device.

The processor 174 may be further configured to execute the following operations: translating source address information and source port information of the second target packet into address information and port information of the network device to obtain a third target packet; controlling the transmitter 172 to send the third target packet to a target device identified by destination address information of the first target packet. The processor 174 may be further configured to execute the following operations: controlling the receiver 173 to receive a first response packet sent by the target device, and translate destination address information and destination port information of the first response packet into the address information and port information of the first device to obtain a second response packet, where the first response packet is a response packet sent by the target device according to the third target packet; and controlling the transmitter 172 to send the second response packet to the first device through the transparent transmission channel, so that the first device translates destination address information and destination port information of the second response packet into the source address information and source port information of the first target packet to obtain a third response packet, and the first device sends the third response packet to a device identified by the source address information of the first target packet.

Optionally, the address information and port information may be translated by NAT.

Optionally, when receiving the second target packet, the network device may perform NAT on the packet, and send a packet obtained through translation to the target device.

Optionally, the first device may include but is not limited to any one of the following devices: an access device, a gateway device, a server, and a user equipment.

Optionally, the network device may include but is not limited to any one of the following devices: an access device, a gateway device, a server, and a user-side device.

However, the first device and the network device are two different devices. For example, when the first device is an access device, the network device may be a server; when the first device is a server, the network device may be an access device, a gateway device, or a user equipment; when the first device is a user-side device, the network device may be an access device, a gateway device, or a server.

Optionally, the links between the first device and the network device include but are not limited to any one of the following links: a DSL link, an LTE link, an FTTX link, an E1 link, a GSM link, a cable link, a fiber optic link, and so on.

Optionally, the transparent transmission channel includes but is not limited to any one of the following channels: a VPN tunnel, a GRE tunnel, and so on.

Optionally, the first target packet may be one or more packets.

In another optional embodiment, the processor 174 may be further configured to execute the following operations: establishing a transparent transmission channel with a first device, where the transparent transmission channel spans multiple links connected to the network device and the first device; controlling the receiver 173 to receive, through the transparent transmission channel, a second target packet sent by the first device, where the second target packet is a packet obtained by the first device by translating source address information and source port information of a first target packet into address information and port information of the first device; translating source address information and source port information of the second target packet into address information and port information of the network device to obtain a third target packet; controlling the transmitter 172 to send the third target packet to a target device identified by destination address information of the first target packet; controlling the receiver 173 to receive a first response packet sent by the target device, and translate destination address information and destination port information of the first response packet into the address information and port information of the first device to obtain a second response packet, where the first response packet is a response packet sent by the target device according to the third target packet; executing a link bonding policy, and selecting a target link from the links that are connected to the network device and the first device and spanned by the transparent transmission channel; encapsulating the second response packet with the target link to obtain a fourth response packet; and controlling the transmitter 172 to send, through the target link, the fourth response packet to an interface, on which the target link is established, of the first device, obtain so that the first device decapsulates the fourth response packet to obtain a third response packet, and the first device sends the third response packet to a device identified by the source address information of the first target packet.

In the foregoing technical solution, a network device establishes a transparent transmission channel with a first device, where the transparent transmission channel spans multiple links connected to the network device and the first device; the network device receives, through the transparent transmission channel, a second target packet sent by the first device, where the second target packet is a packet obtained by the first device by translating source address information and source port information of a first target packet into address information and port information of the first device; the network device translates source address information and source port information of the second target packet into address information and port information of the network device to obtain a third target packet; the network device sends the third target packet to a target device identified by destination address information of the first target packet; the network device receives a first response packet sent by the target device, and translates destination address information and destination port information of the first response packet into the address information and port information of the first device to obtain a second response packet, where the first response packet is a response packet sent by the target device according to the third target packet; and the network device sends the second response packet to the first device through the transparent transmission channel, so that the first device translates destination address information and destination port information of the second response packet into the source address information and source port information of the first target packet to obtain a third response packet, and the first device sends the third response packet to a device identified by the source address information of the first target packet. In this way, NAT is performed when a packet is transmitted between the first device and the network device, and thereby packet transmission efficiency may be improved.

Figure 29:
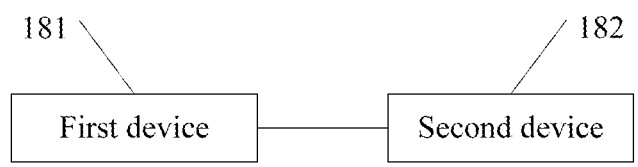
FIG. 29 is a schematic structural diagram of a multi-link aggregation system according to an embodiment of the present invention.

FIG. 29 is a schematic structural diagram of a multi-link aggregation system according to an embodiment of the present invention. As shown in FIG. 29, the system includes a first device 181 and a second device 182.

The first device 181 may be the network device in any one implementation manner of the embodiments shown in FIG. 23, FIG. 24, and FIG. 27.

The second device 182 may be the network device in any one implementation manner of the embodiments shown in FIG. 25, FIG. 26, and FIG. 28.

In the foregoing technical solution, a first device establishes a transparent transmission channel with a second device, where the transparent transmission channel spans multiple links connected to the first device and the second device; the first device performs NAT on a first target packet to obtain a second target packet; and the first device transmits the second target packet to the second device through the transparent transmission channel, so that the second device performs NAT on the second target packet to obtain a third target packet, and the second device sends the third target packet to a target device identified by destination address information of the first target packet. In this way, NAT is performed when a packet is transmitted between the first device and the second device. Therefore, network address resources are saved, a fast forwarding capability of a router on a transmission path may be used, and thereby packet transmission efficiency may be improved.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

The disclosed are merely exemplary embodiments of the present invention, but are not intended to limit the scope of the present invention. Equivalent variation figured out according to the claims shall fall within the protection scope of the present invention.

What is claimed is:

1. A multi-link aggregation method comprising:
    establishing, by a first device, a transparent transmission channel with a second device, the transparent transmission channel comprising a plurality of links between the first device and the second device, wherein the plurality of links support different access technologies, and each of the plurality of links connecting the first device to the second device;

performing, by the first device when a first target packet comprising first source address information and first source port information is to be transmitted to a second device, network address translation on the first target packet to obtain a second target packet comprising second source address information and second source port information, the first source address information identifying a source device of the first target packet, and performing the network address translation comprising translating the first source address information and the first source port information of the first target packet into address information and port information of the first device, wherein the second source address information comprises the address information of the first device, and the second source port information comprises the port information of the first device;

selecting a target link from the plurality of links for transmission of the first target packet through the transparent transmission channel; and transmitting, by the first device, the second target packet to the second device through the selected target link in the transparent transmission channel, wherein the second device performs network address translation on the second target packet to obtain a third target packet by translating the second source address information and the second source port information of the second target packet into address information and port information of the second device, and the second device sends the third target packet to a target device identified by destination address information of the first target packet, wherein the first target packet, the second target packet, and the third target packet comprise the same payload.

2. The method according to claim 1, wherein, after performing the network address translation and before transmitting the second target packet to the second device, the method further comprises:

executing, by the first device, a link bonding policy for selecting the target link from the plurality of links; and encapsulating, by the first device, the second target packet with the target link to obtain a fourth target packet; and wherein transmitting, by the first device, the second target packet to the second device comprises:

transmitting, by the first device, the fourth target packet to the second device through the target link.

3. The method according to claim 2, wherein: the executing comprises:

analyzing, by the first device, a bandwidth parameter of each of the plurality of links; and analyzing, by the first device according to the bandwidth parameter of each of the plurality of links, a speed and a packet length for sending to a buffer of a respective link, and selecting the target link from the plurality of links; and wherein transmitting, by the first device, the fourth target packet to the second device through the target link, comprises:

sending, by the first device, the fourth target packet to the buffer of the target link according to the speed and packet length for sending to the buffer of the target link, and sending the fourth target packet in the buffer to the second device through the target link.

4. A multi-link aggregation method comprising:

performing, by a second device when a first response packet comprising first destination address information and first destination port information is to be transmitted to a first device, network address translation on the first response packet to obtain a second response packet comprising second destination address information and second destination port information, the first destination address information identifying the second device, wherein the first response packet is a response packet that is received by the second device from a target device and sent by the target device in response to a target packet that is sent in advance by the first device to the target device, performing the network address translation comprising translating the first destination address information and the first destination port information of the first response packet into address information and port information of the first device, wherein the second destination address information comprises the address information of the first device and the second destination port information comprises the port information of the first device;

selecting a target link from a plurality of links in a transparent transmission channel established in advance between the second device and the first device, each of the plurality of links connecting the second device to the first device and the plurality of links supporting different access technologies; and transmitting, by the second device, the second response packet to the first device through the target link in the transparent transmission channel, so that the first device performs network address translation on the second response packet to obtain a third response packet by translating the second destination address information and the second destination port information into source address information and source port information of the target packet, and the first device sends the third response packet to a device identified by the source address information of the target packet, wherein the first response packet, the second response packet, and the third response packet comprise the same payload.

5. The method according to claim 4, wherein, after performing, by the second device, the network address translation on the first response packet and before transmitting, by the second device, the second response packet to the first device, the method further comprises:

executing, by the second device, a link bonding policy for selecting the target link from the plurality of links;

encapsulating, by the second device, the second response packet with the target link to obtain a fourth response packet; and wherein transmitting, by the second device, the second response packet to the first device through the transparent transmission channel, comprises:

sending, by the second device through the target link, the fourth response packet to an interface, on which the target link is established, of the first device.

6. The method according to claim 5, wherein executing, by the second device, the link bonding policy comprises:

receiving, by the second device, a bandwidth parameter, which is sent by the first device, of each of the plurality of links, wherein a bandwidth parameter of each link is obtained by the first device by analysis;

analyzing, by the second device according to the bandwidth parameter of each link, a speed and a packet length for sending to a buffer of the respective link, and selecting the target link from the plurality of links; and wherein the sending, by the second device through the target link, the fourth response packet to an interface, on which the target link is established, of the first device, comprises:
sending, by the second device, the fourth response packet to the buffer of the target link according to the speed and packet length for sending to the buffer of the target link, and sending the fourth response packet in the buffer to the interface, on which the target link is established, of the first device.

7. A network device, comprising:
a processor; and
a memory storing a program to be executed by the processor, the program comprising instructions to:
establish a transparent transmission channel with a second device, wherein the transparent transmission channel spans a plurality of links between the network device and the second device, the plurality of links supporting different access technologies and connect the network device with the second device,
perform, when a first target packet comprising first source address information and first source port information is to be transmitted to a second device, network address translation on the first target packet to obtain a second target packet comprising second source address information and second source port information, the first source address information identifying a source device of the first target packet, and the network address translation comprising translating the first source address information and the first source port information of the first target packet into address information and port information of the network device, wherein the second source address information comprises the address information of the network device, and the second source port information comprises the port information of the network device;
select a target link from the plurality of links for transmission of the first target packet through the transparent transmission channel; and
transmit the second target packet to the second device through the target link in the transparent transmission channel, so that the second device performs network address translation on the second target packet to obtain a third target packet by translating the second source address information and the second source port information of the second target packet into address information and port information of the second device, and the second device sends the third target packet to a target device identified by destination address information of the first target packet, wherein the first target packet, the second target packet, and the third target packet comprise the same payload.

8. The network device according to claim 7, wherein the program further comprises instructions to:
execute a link bonding policy for selecting the target link from the plurality of links;
encapsulate the second target packet with the target link to obtain a fourth target packet, wherein address information and port information of an interface of the network device corresponding to the target link is added to obtain the fourth target packet; and
transmit the fourth target packet to the second device through the target link.

9. The network device according to claim 8, wherein the program further comprises instructions to:

analyze a bandwidth parameter of each of the plurality of links;
analyze, according to the bandwidth parameter of each of the plurality of links, a speed and a packet length for sending to a buffer of the respective link, and select the target link from the plurality of links; and
send the fourth target packet to the buffer of the target link according to the speed and packet length for sending to the buffer of the target link, and send the fourth target packet in the buffer to the second device through the target link.

10. A network device, comprising:
a processor; and
a memory storing a program to be executed by the processor, the program comprising instructions to:
perform, when a first response packet comprising first destination address information and first destination port information is to be transmitted to a first device, network address translation on the first response packet to obtain a second response packet comprising second destination address information and second destination port information, the first destination address information identifying the network device, wherein the first response packet is a response packet that is received by the network device from a target device and sent by the target device in response to a target packet that is sent in advance by the first device to the target device, the network address translation comprising translating the first destination address information and the first destination port information of the first response packet into address information and port information of the first device, wherein the second destination address information comprises the address information of the first device and the second destination port information comprises the port information of the first device;
select a target link from a plurality of links in a transparent transmission channel established in advance between the network device and the first device, the plurality of links connecting the network device with the first device and supporting different access technologies; and
transmit the second response packet to the first device through the target link in the transparent transmission channel, so that the first device performs network address translation on the second response packet to obtain a third response packet by translating the second destination address information and the second destination port information into source address information and source port information of the target packet, and the first device sends the third response packet to a device identified by the source address information of the target packet, wherein the first response packet, the second response packet, and the third response packet comprise the same payload.

11. The network device according to claim 10, wherein the program further comprises instructions to:
execute a link bonding policy for selecting the target link from the plurality of links;
encapsulate the second response packet with the target link to obtain a fourth response packet; and
send, through the target link, the fourth response packet to an interface, on which the target link is established, of the first device.

12. The network device according to claim 11, wherein the program further comprises instructions to:

receive a bandwidth parameter, which is sent by the first device, of each of the plurality of links, wherein a bandwidth parameter of each link is obtained by the first device by analysis;

analyze, according to the bandwidth parameter of each link, a speed and a packet length for sending to a buffer of the respective link, and select the target link from the plurality of links; and send the fourth response packet to the buffer of the target link according to the speed and packet length for sending to the buffer of the target link, and send the fourth response packet in the buffer to the interface, on which the target link is established, of the network device.

13. The method according to claim 1, wherein the transparent transmission channel comprises more than one access technology.

14. The method according to claim 4, wherein the transparent transmission channel comprises more than one access technology.

15. The network device according to claim 7, wherein the transparent transmission channel comprises more than one access technology.

16. The network device according to claim 10, wherein the transparent transmission channel comprises more than one access technology.

* * * * *

UNITED STATES PATENT AND TRADEMARK OFFICE
CERTIFICATE OF CORRECTION

PATENT NO. : 10,050,880 B2
APPLICATION NO. : 14/586734
DATED : August 14, 2018
INVENTOR(S) : Chen et al.

Page 1 of 1

It is certified that error appears in the above-identified patent and that said Letters Patent is hereby corrected as shown below:

On the Title Page

Item (73) Assignee, Line 1, delete "Huawei Device Co., Ltd., Shenzhen" and insert --Huawei Device (Shenzhen) Co., Ltd., Shenzhen--.

Signed and Sealed this
Thirtieth Day of July, 2019

Andrei Iancu
*Director of the United States Patent and Trademark Office*